US010304032B2

United States Patent
Iwai et al.

(10) Patent No.: US 10,304,032 B2
(45) Date of Patent: May 28, 2019

(54) PRODUCT MONITORING DEVICE, PRODUCT MONITORING SYSTEM, AND PRODUCT MONITORING METHOD

(71) Applicant: PANASONIC INTELLECTUAL PROPERTY MANAGEMENT CO., LTD., Osaka (JP)

(72) Inventors: Kazuhiko Iwai, Kanagawa (JP); Tetsurou Kakizawa, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 258 days.

(21) Appl. No.: 15/038,509

(22) PCT Filed: Oct. 29, 2014

(86) PCT No.: PCT/JP2014/005464
§ 371 (c)(1),
(2) Date: May 23, 2016

(87) PCT Pub. No.: WO2015/079622
PCT Pub. Date: Jun. 4, 2015

(65) Prior Publication Data
US 2016/0300181 A1    Oct. 13, 2016

(30) Foreign Application Priority Data
Nov. 27, 2013 (JP) ................................ 2013-244995

(51) Int. Cl.
*G06Q 10/08* (2012.01)
*G06Q 30/06* (2012.01)
(Continued)

(52) U.S. Cl.
CPC ....... *G06Q 10/087* (2013.01); *G06K 9/00771* (2013.01); *G06Q 30/02* (2013.01); *G06Q 30/06* (2013.01)

(58) Field of Classification Search
CPC ........ G06Q 10/00; G06Q 30/02; G06Q 10/08; G06F 15/17; G06F 15/18; G06K 17/00; G06K 9/50
(Continued)

(56) References Cited

U.S. PATENT DOCUMENTS

| 8,219,438 B1 * | 7/2012 | Moon ................ G06Q 30/0201 705/7.29 |
| 2003/0132298 A1 * | 7/2003 | Swartz ................... G06K 17/00 235/472.02 |

(Continued)

FOREIGN PATENT DOCUMENTS

| JP | 05-081552 | 4/1993 |
| JP | 2003-114968 | 4/2003 |

(Continued)

OTHER PUBLICATIONS

International Search Report in International Patent Application No. PCT/JP2014/005464, dated Dec. 2, 2014.
(Continued)

*Primary Examiner* — Olusegun Goyea
(74) *Attorney, Agent, or Firm* — Greenblum & Bernstein, P.L.C.

(57) ABSTRACT

To enable a notification instructing a goods management work to be made at an appropriate and effective timing, a goods monitoring device for monitoring a display state of goods based on captured images of a display area in a store includes: a goods detection unit that detects goods in the display area based on captured images of the display area; a goods state detection unit that detects a goods display state in the display area; a person detection unit that detects persons staying in the store; a person state detection unit that detects a person staying state in the store; a notification determination unit that determines propriety of a notification instructing a store staff member to perform a goods management work; and a notification unit that makes the notification based on a result of determination by the notification determination unit.

9 Claims, 14 Drawing Sheets

(51) Int. Cl.
*G06Q 30/02* (2012.01)
*G06K 9/00* (2006.01)

(58) Field of Classification Search
USPC ........ 705/28, 7.29, 7.31; 382/103, 100, 159, 382/209
See application file for complete search history.

(56) References Cited

U.S. PATENT DOCUMENTS

| | | | |
|---|---|---|---|
| 2007/0279214 A1* | 12/2007 | Buehler | G08B 13/19615 340/521 |
| 2007/0283004 A1* | 12/2007 | Buehler | G06Q 30/02 709/224 |
| 2008/0077510 A1 | 3/2008 | Dielemans | |
| 2009/0060349 A1* | 3/2009 | Linaker | G06K 9/00664 382/209 |
| 2009/0063306 A1* | 3/2009 | Fano | G06K 9/00 705/28 |
| 2009/0063307 A1* | 3/2009 | Groenovelt | G06Q 10/087 705/28 |
| 2010/0065632 A1 | 3/2010 | Babcock et al. | |

FOREIGN PATENT DOCUMENTS

| | | |
|---|---|---|
| JP | 2004-133583 | 4/2004 |
| JP | 3908047 | 4/2007 |
| JP | 4456437 | 4/2010 |

OTHER PUBLICATIONS

European Search Report issued in European Patent Application No. 14865351.2, dated Aug. 18, 2016.

* cited by examiner

Fig. 4
(A − 1) state in which there is a disturbance in goods display (goods placed in an inner part)
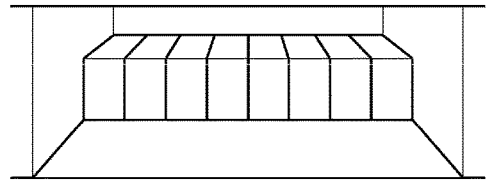
(A − 2) state in which there is no disturbance in goods display (goods placed on the front row)
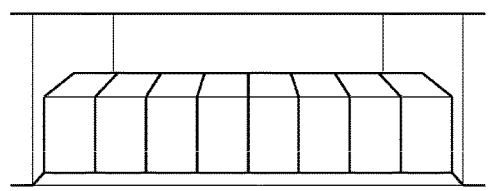
(B − 1) empty state
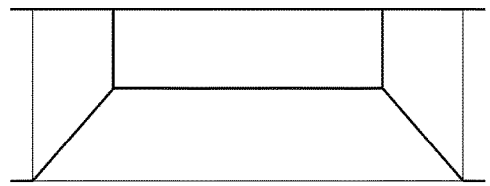
(B − 2) shortage state
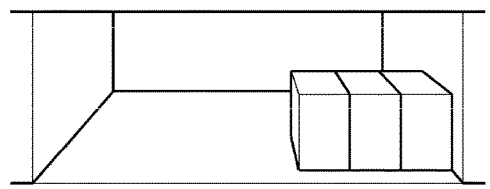
(B − 3) sufficient state
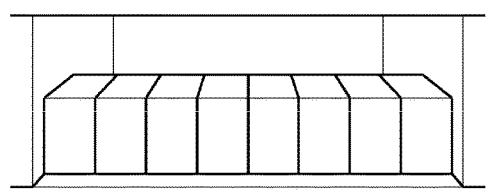

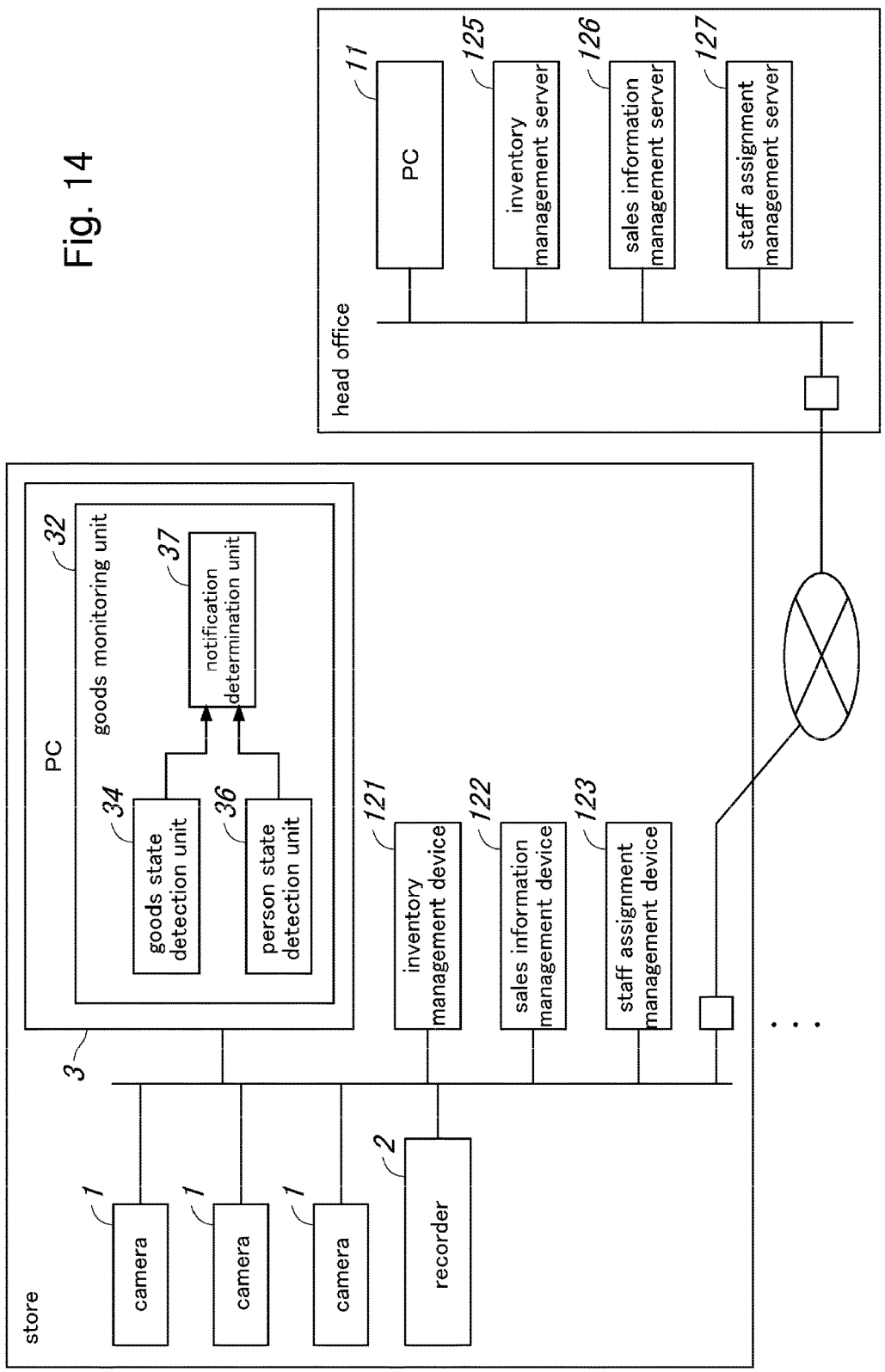

PRODUCT MONITORING DEVICE, PRODUCT MONITORING SYSTEM, AND PRODUCT MONITORING METHOD

TECHNICAL FIELD

The present invention relates to a goods monitoring device, a goods monitoring system and a goods monitoring method for monitoring a display state of goods based on captured images of a display area in a store.

BACKGROUND ART

A monitoring system is widely adopted in stores such as convenience stores, in which cameras are set up in each store to capture images of an interior of the store so that persons in the store can be monitored by the images captured by the cameras. If these surveillance cameras or other cameras are used to capture images of display areas such that a display state of goods is monitored based on the captured images, it is possible to detect, based on the display state of the goods, a defect in the goods display, and to make a notification to instruct a store staff member to perform a goods management work (arranging work and replenishing work), thereby removing the defect in the goods display swiftly and avoiding a loss of sales opportunity or reduction in customer satisfaction due to the defect in the goods display.

As a technology relating to such instruction of a goods management work, a technology is conventionally known which determines the necessity of replenishment of goods based on the captured images of a display area and makes a notification instructing a replenishing work (see Patent Document 1). Further, a technology is known which determines the necessity of arranging the goods based on the captured images of a display area and makes a notification instructing an arranging work (see Patent Document 2). Also, a technology is known which generates corrected images by removing obstacles from the captured images of a display area, thereby making it possible to easily grasp the state of arrangement of the goods in the display area (see Patent Document 3).

PRIOR ART DOCUMENT(S)

Patent Document(s)

Patent Document 1: JPH05-081552A
Patent Document 2: JP3908047B
Patent Document 3: JP4456437B

BRIEF SUMMARY OF THE INVENTION

Task to be Accomplished by the Invention

However, in the above prior art technologies, although it is possible to monitor the display state of the goods in the display area and to instruct the store staff member to perform a goods management work (arranging work and replenishing work) as necessary, there was a problem that the notification instructing the store staff member to perform a goods management work may not be made at an appropriate and effective timing.

For example, if the store staff member receives an instruction to perform a goods management work while dealing with a customer who is making payment at the checkout counter, the store staff member cannot perform the goods management work immediately because dealing with customers is given a high priority. Further, if there is a customer in front of the display shelf that requires a goods management work, it is not possible to perform the goods management work as it would interfere with the customer. Thus, only with monitoring the display state of the goods, a notification instructing a store staff member to perform a goods management work cannot be made at an appropriate and effective timing.

The present invention has been made to solve such prior art problems, and a main object thereof is to provide a goods monitoring device, a goods monitoring system and a goods monitoring method configured to be able to make a notification instructing a goods management work at an appropriate and effective timing.

Means to Accomplish the Task

An goods monitoring device of the present invention is a goods monitoring device for monitoring a display state of goods based on captured images of a display area in a store, the device comprising: a goods detection unit that detects goods in the display area based on captured images of the display area; a goods state detection unit that detects a goods display state in the display area based on a result of detection by the goods detection unit; a person detection unit that detects persons staying in the store based on captured images of an interior of the store; a person state detection unit that detects a person staying state in the store based on a result of detection by the person detection unit; a notification determination unit that determines propriety of a notification instructing a store staff member to perform a goods management work based on a result of detection by the goods state detection unit and a result of detection by the person state detection unit; and a notification unit that makes the notification based on a result of determination by the notification determination unit.

Further, a goods monitoring system of the present invention is a goods monitoring system for monitoring a display state of goods based on captured images of a display area in a store, the system comprising: a camera for capturing images of an interior of the store; and a plurality of information processing devices, wherein any one of the plurality of information processing devices comprises: a goods detection unit that detects goods in the display area based on captured images of the display area; a goods state detection unit that detects a goods display state in the display area based on a result of detection by the goods detection unit; a person detection unit that detects persons staying in the store based on captured images of the interior of the store; a person state detection unit that detects a person staying state in the store based on a result of detection by the person detection unit; a notification determination unit that determines propriety of a notification instructing a store staff member to perform a goods management work based on a result of detection by the goods state detection unit and a result of detection by the person state detection unit; and a notification unit that makes the notification based on a result of determination by the notification determination unit.

Further, a goods monitoring method of the present invention is a goods monitoring method for making an information processing device perform a process of monitoring a display state of goods based on captured images of a display area in a store, the method comprising: a step of detecting goods in the display area based on captured images of the display area; a step of detecting a goods display state in the display area based on a result of detection by the step of detecting goods; a step of detecting persons staying in the store based on captured images of an interior of the store; a step of detecting a person staying state in the store based on a result of detection by the step of detecting persons; a step of determining propriety of a notification instructing a store staff member to perform a goods management work based on a result of detection by the step of detecting a goods state and a result of detection by the step of detecting a person state; and a step of making the notification based on a result of determination by the step of determining propriety of a notification.

Effect of the Invention

According to the present invention, the propriety of a notification instructing a goods management work is determined taking into account the person staying state in addition to the goods display state, and therefore, a notification can be made at an appropriate and effective timing. Namely, the necessity and feasibility of the goods management work can be determined based on the goods display state and the person staying state, and thus, by taking into account both the goods display state and the person staying state, a notification is made when the goods management work is necessary and feasible, whereby a notification can be made at an appropriate and effective timing.

BRIEF DESCRIPTION OF THE DRAWINGS

FIG. 4 is an explanatory diagram showing in (A-1), (A-2), (B-1) and (B-2) display states of goods in a display area (display shelf);

FIG. 14 is an overall configuration diagram of a goods monitoring system according to the second embodiment of the present invention.

EMBODIMENTS FOR CARRYING OUT THE INVENTION

Figure 1:
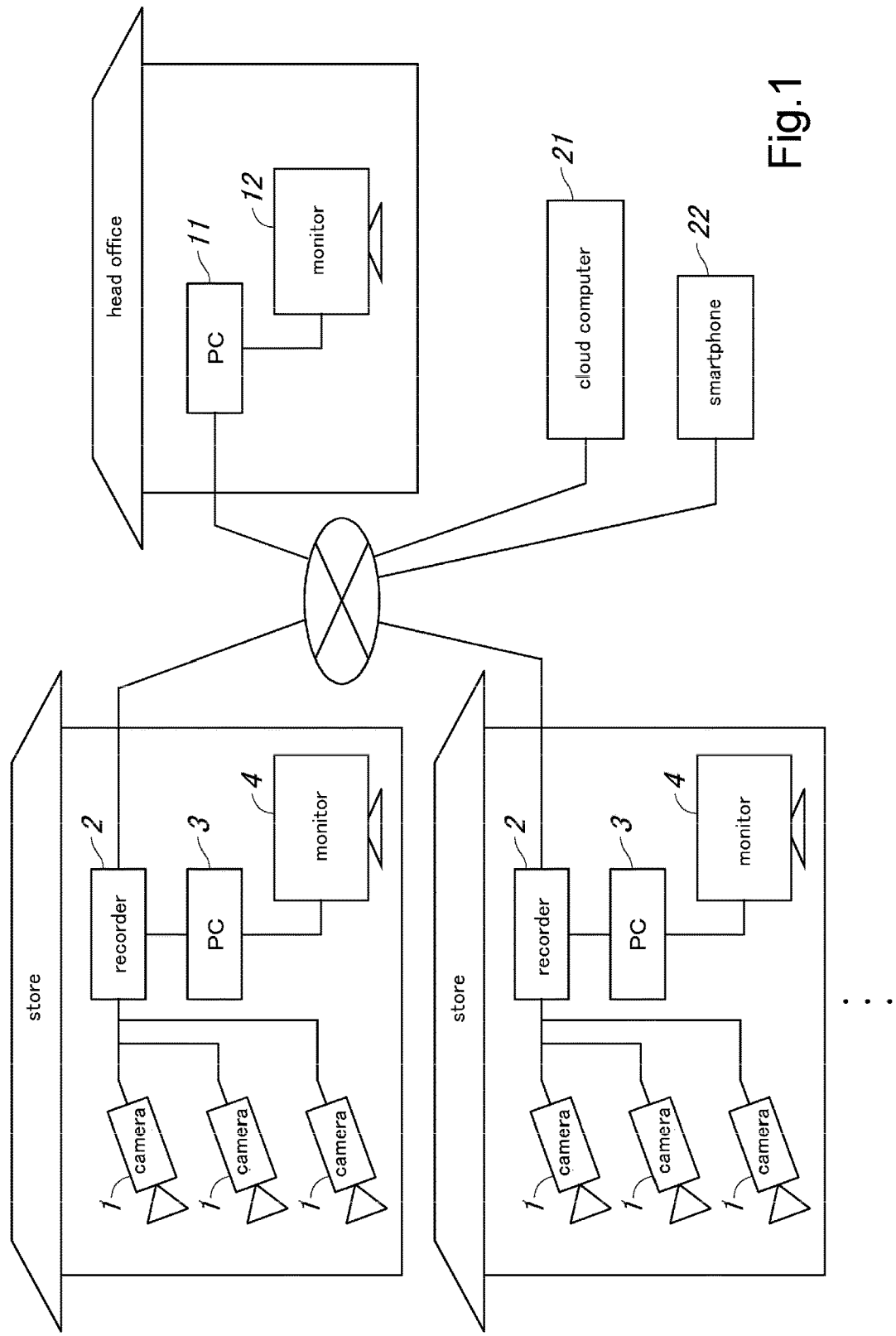
FIG. 1 is an overall configuration diagram of a goods monitoring system according to the first embodiment of the present invention.

To achieve the above object, the first aspect of the present invention provides a goods monitoring device for monitoring a display state of goods based on captured images of a display area in a store, the device comprising: a goods detection unit that detects goods in the display area based on captured images of the display area; a goods state detection unit that detects a goods display state in the display area based on a result of detection by the goods detection unit; a person detection unit that detects persons staying in the store based on captured images of an interior of the store; a person state detection unit that detects a person staying state in the store based on a result of detection by the person detection unit; a notification determination unit that determines propriety of a notification instructing a store staff member to perform a goods management work based on a result of detection by the goods state detection unit and a result of detection by the person state detection unit; and a notification unit that makes the notification based on a result of determination by the notification determination unit.

According to this configuration, the propriety of a notification instructing a goods management work is determined taking into account the person staying state in addition to the goods display state, and therefore, a notification can be made at an appropriate and effective timing. Namely, the necessity and feasibility of the goods management work can be determined based on the goods display state and the person staying state, and thus, by taking into account both the goods display state and the person staying state, a notification is made when the goods management work is necessary and feasible, whereby a notification can be made at an appropriate and effective timing.

In the second aspect of the present invention, the person state detection unit detects a person staying state in a payment area where a customer making payment stays, and the notification determination unit does not make the notification when the person staying state in the payment area detected by the person state detection unit is such that makes it difficult to perform the goods management work.

According to this configuration, it is possible to avoid making an ineffectual notification when a goods management work is difficult to perform.

In the third aspect of the present invention, the person state detection unit detects a person staying state in a goods access area where a customer taking a look at the goods displayed in the display area stays, and the notification determination unit does not make the notification when the person staying state in the goods access area detected by the person state detection unit is such a state that makes it difficult to perform the goods management work in the goods access area.

According to this configuration, it is possible to avoid making an ineffectual notification when goods management work is difficult to perform.

In the fourth aspect of the present invention, the person state detection unit detects a person staying state in a payment area where a customer making payment stays and in a goods access area where a customer taking a look at the goods displayed in the display area stays, and the notification determination unit makes the notification when the goods display state detected by the goods state detection unit is such a state that requires a goods management work, the person staying state in the payment area detected by the person state detection unit is not such a state that makes it difficult to perform the goods management work, and the person staying state in the goods access area detected by the person state detection unit is not such a state that makes it difficult to perform the goods management work in the goods access area.

According to this configuration, a notification is made when the goods management work is necessary and not difficult to perform, whereby a notification can be made at an appropriate and effective timing.

In the fifth aspect of the present invention, the goods state detection unit detects, as the goods display state, at least one of a display disturbance state and a display shortage state, and the notification unit makes a notification instructing the store staff member to perform, as the goods management work, at least one of an arranging work for resolving a disturbance in goods display and a replenishing work for resolving a shortage of goods.

According to this configuration, when there is a defect in the display of goods, it is possible to make an appropriate notification in accordance with the content of the defect. Thereby, a store staff member is allowed to swiftly perform an appropriate goods management work in accordance with the content of the notification.

In the sixth aspect of the present invention, the notification determination unit determines the propriety of a notification based on at least one of inventory information, sales information and store staff assignment information, in addition to the result of detection by the goods state detection unit and the result of detection by the person state detection unit.

According to this configuration, the propriety of a notification is determined by taking into account the inventory state, sales state and store staff assignment state of the store based on the inventory information, sales information and store staff assignment information, and therefore, a notification can be made at an even more appropriate and effective timing.

In the seventh aspect of the present invention, the goods monitoring device further comprises: an information storage unit that stores information relating to the goods display state at each detection time acquired by the goods state detection unit, and information relating to the notification made by the notification unit; an aggregation unit that acquires a result of aggregation relating to a temporal transition of the goods display state and a state of generation of the notification based on the information stored in the information storage unit; and a display information generation unit that generates display information integrating together the temporal transition of the goods display state and the state of generation of the notification based on the result of aggregation acquired by the aggregation unit.

According to this configuration, the user can grasp at what timing the notification was generated while comparing it with the temporal transition of the goods display state.

In the eighth aspect of the present invention, the goods state detection unit detects, as the goods display state, a display disturbance state and a display shortage state, and the goods monitoring device further comprises an input information acquisition unit that, in accordance with an input operation by a user, acquires an input information for selecting a type of notification corresponding to each of the display disturbance state and the display shortage state, wherein the aggregation unit acquires a result of aggregation relating to the state of generation of the notification of the type selected by the user based on the input information acquired by the input information acquisition unit, and wherein the display information generation unit generates the display information relating to the result of aggregation.

According to this configuration, the user can grasp, for each type of the notification, at what timing the notification was generated while comparing it with the temporal transition of the goods display state. Thereby, it is possible to examine the problems relating to the goods management in the store in accordance with the type of the notification, namely, in accordance with the content of the defect in the goods display.

In the ninth aspect of the present invention, the person state detection unit acquires, as the person staying state, a number of staying persons at each detection time, the information storage unit stores the number of staying persons at each detection time acquired by the person state detection unit, the aggregation unit acquires a result of aggregation relating to a temporal transition of the number of staying persons based on the information stored in the information storage unit, and the display information generation unit generates display information that integrates the temporal transition of the number of staying persons with the temporal transition of the goods display state and the state of generation of the notification based on the result of aggregation acquired by the aggregation unit.

According to this configuration, the user can grasp the state of generation of the notification while comparing it with the temporal transition of the number of the persons staying in the store. Thereby, it is possible to recognize the problems relating to the goods management in the store.

In the tenth aspect of the present invention, the goods monitoring device further comprises: an information storage unit that stores the result of detection of the goods display state at each detection time acquired by the goods state detection unit; a goods state aggregation unit that aggregates, for each predetermined aggregation period, the detection result at each detection time stored in the information storage unit, and acquires s goods display state for each aggregation period; and a display information generation unit that generates display information relating to the goods display state for each aggregation period acquired by the goods state aggregation unit.

According to this configuration, the user can grasp the goods display state for each aggregation period. Further, by comparing the goods display states for different aggregation periods with each other, the user can grasp the difference in the goods display state between different aggregation periods.

The eleventh aspect of the present invention provides a goods monitoring system for monitoring a display state of goods based on captured images of a display area in a store, the system comprising: a camera for capturing images of an interior of the store; and a plurality of information processing devices, wherein any one of the plurality of information processing devices comprises: a goods detection unit that detects goods in the display area based on captured images of the display area; a goods state detection unit that detects a goods display state in the display area based on a result of detection by the goods detection unit; a person detection unit that detects persons staying in the store based on captured images of the interior of the store; a person state detection unit that detects a person staying state in the store based on a result of detection by the person detection unit; a notification determination unit that determines propriety of a notification instructing a store staff member to perform a goods management work based on a result of detection by the goods state detection unit and a result of detection by the person state detection unit; and a notification unit that makes the notification based on a result of determination by the notification determination unit.

According to this configuration, as in the first aspect of the present invention, it is possible to make a notification instructing a goods management work at an appropriate and effective timing.

The twelfth aspect of the present invention provides a goods monitoring method for making an information processing device perform a process of monitoring a display state of goods based on captured images of a display area in a store, the method comprising: a step of detecting goods in the display area based on captured images of the display area; a step of detecting a goods display state in the display area based on a result of detection by the step of detecting goods; a step of detecting persons staying in the store based on captured images of an interior of the store; a step of detecting a person staying state in the store based on a result of detection by the step of detecting persons; a step of determining propriety of a notification instructing a store staff member to perform a goods management work based on a result of detection by the step of detecting a goods state and a result of detection by the step of detecting a person state; and a step of making the notification based on a result of determination by the step of determining propriety of a notification.

According to this configuration, as in the first aspect of the present invention, it is possible to make a notification for instructing a goods management work at an appropriate and effective timing.

Hereinafter, embodiments of the present invention will be described with reference to the drawings.

First Embodiment

FIG. 1 is an overall configuration diagram of a goods monitoring system according to the first embodiment of the present invention. This person behavior analysis system is typically designed for a chain of retail stores such as convenience stores, and includes cameras (imaging device) 1, a recorder (image recording device) 2, a PC (goods monitoring device) 3 and a monitor (display device) 4, which are set up at each of multiple stores. The system further includes a PC 11 and a monitor 12, which are set up at a head office overseeing the multiple stores.

The cameras 1 are set up at appropriate locations in the store to capture images of an interior of the store, and image information obtained thereby is recorded by the recorder 2. On the PC 3 set up at the store and the PC 11 set up at the head office, it is possible to browse the images of the interior of the store captured by the cameras 1 in real time and browse the past images of the interior of the store recorded in the recorder 2, and this allows a user at the store or the head office to check the situation in the store.

The PC 3 set up at each store is configured as a goods monitoring device for monitoring the display state of the goods in the store. Further, the PC 3 performs an analysis process on the display state of the goods in the store, etc., and the analysis result information generated by the analysis process can be displayed on the PC 3 itself and also is transmitted to the PC 11 set up at the head office, such that the information can be displayed on the PC 7. Thus, the PCs 3 and 11 are each configured as a browser device that allows a user to view the analysis result information.

Figure 2:
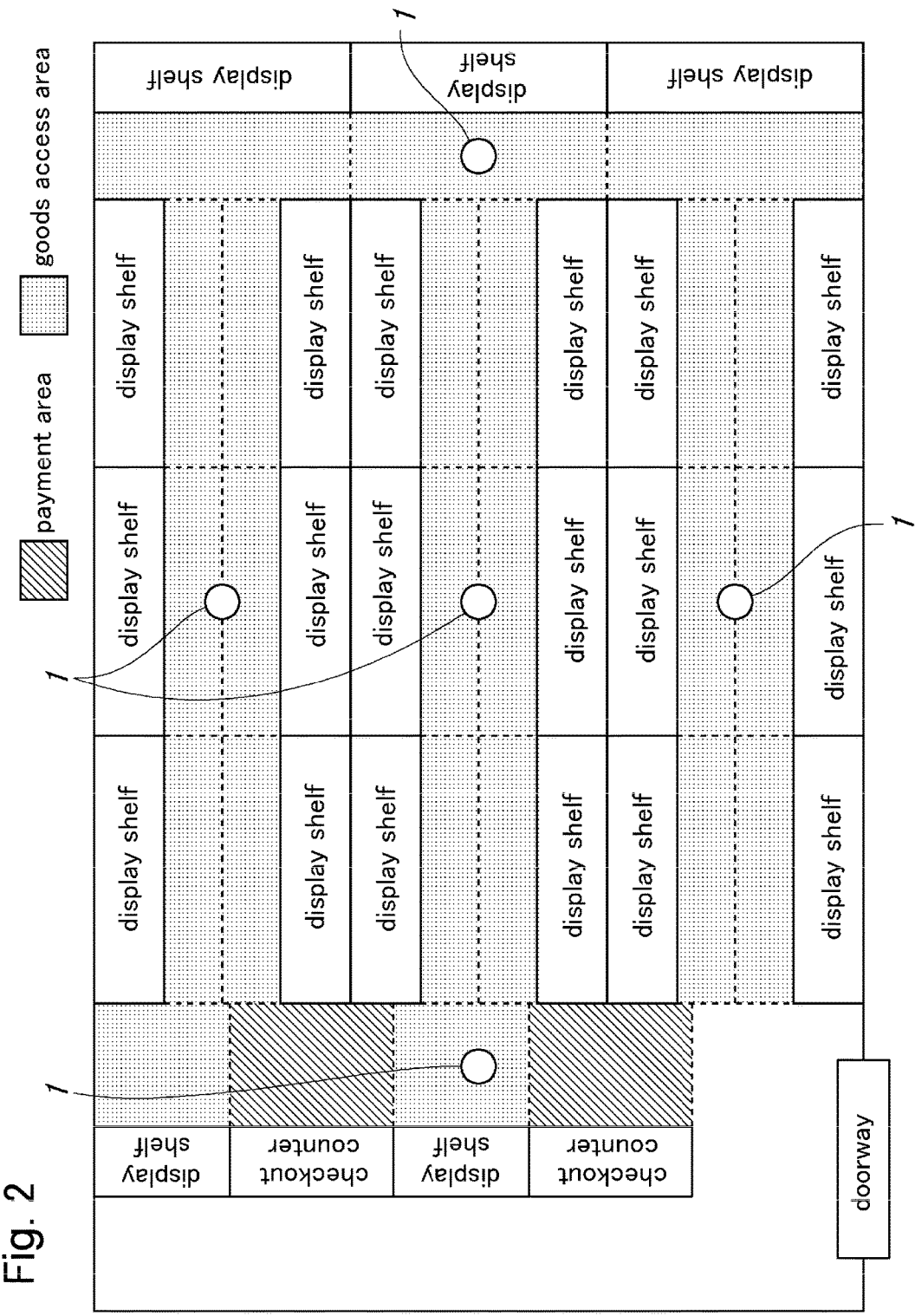
FIG. 2 is a plan view of a store for explaining a layout of the store and an arrangement of cameras 1.

Next, taking a convenience store as an example, description will be made of a layout of the store and an arrangement of the cameras 1. FIG. 2 is a plan view of a store for explaining a layout of the store and an arrangement of the cameras 1.

The store includes a doorway, display shelves (display areas), and checkout counters. The display shelves are set up for respective kinds of goods, such as lunch boxes, PET bottles, rice balls, etc. Next to the checkout counters are arranged display shelves for fast foods.

A customer enters the store through the doorway, moves in the store through passages between the display shelves, and when a desired good is found, goes to the checkout counter with the good, and makes payment (pays for the good) at the checkout counter before exiting the store through the doorway. When the customer makes payment, the customer stays in front of the checkout counter, and to detect such a state of the customer making payment, a payment area is set in front of the checkout counter in the present embodiment. Further, when the customer takes a look at the goods on a display shelf to determine whether to purchase the goods, the customer stays in front of the display shelf. In the present embodiment, to detect such a state of customers taking a look at the goods on the display shelf, goods access areas are set in front of the display shelves. These goods access areas are set for respective display areas.

Further, multiple cameras 1 are installed in the store to capture images of an interior of the store (monitored area). Particularly, in the example shown in FIG. 2, an omnidirectional camera using a fish-eye lens to have a view range of 360 degrees is employed as each camera 1, such that the cameras 1 can capture images of the goods displayed on the display shelves and images of persons staying in front of the display shelves or checkout counters.

It is to be noted that same cameras 1 may be used to capture images of both the display shelves and persons, but the cameras for capturing images of the display shelves and the cameras for capturing images of persons may be installed separately.

Figure 3:
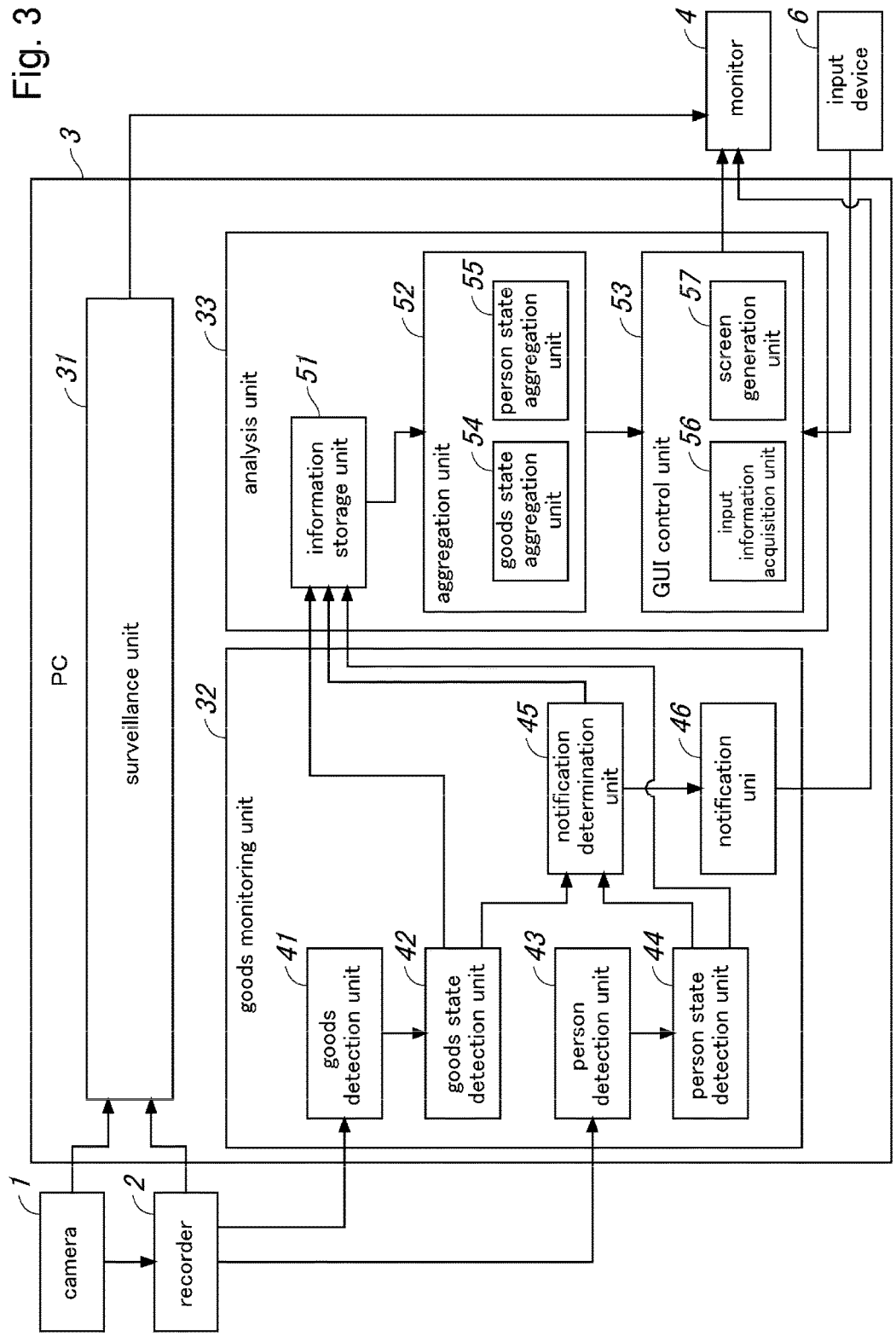
FIG. 3 is a functional block diagram schematically showing the configuration of a PC 3.

Next, description will be made of the functions performed by the PC 3 shown in FIG. 1 with reference to a functional block diagram. FIG. 3 is a functional block diagram schematically showing the configuration of the PC 3.

The PC 3 includes a surveillance unit 31, a goods monitoring unit 32 and an analysis unit 33. The surveillance unit 31 allows the PC 3 to function as a monitoring system for monitoring the interior of the store. The surveillance unit 31 controls the operation of the cameras 1 and the recorder 2 and enables the user to have a real-time view of the images of the interior of the store captured by the cameras 1 as well as to view the images of the interior of the store recorded in the recorder 2.

The goods monitoring unit 32 is provided to monitor the display state of the goods based on the captured images of the display areas (display shelves) in the store, and includes a goods detection unit 41, a goods state detection unit 42, a person detection unit 43, a person state detection unit 44, a notification determination unit 45 and a notification unit 46.

The goods detection unit 41 executes a process of, based on the images of the display areas captured by the cameras 1, detecting the goods in the display areas. This goods detecting process may use known image recognition technology, namely, technology for extracting images of objects from the captured images and obtaining the positions of the objects, and the result of detection of the positions of the goods in each display area is output from the goods detection unit 41 for each detection time.

The goods state detection unit 42 executes a process of detecting a goods display state in each display area based on the result of detection by the goods detection unit 41. This goods state detection process is executed to detect a defect in the goods display, where the defect in the goods display includes a display disturbance state in which there is a disturbance in the arrangement of the goods displayed in the display area and a display shortage state in which there is a shortage in the number of the goods displayed in the display area. The goods state detection process is executed for each of the display disturbance state and the display shortage state, and the result of detection of the goods display state (display disturbance state and display shortage state) at each detection time is output from the goods state detection unit 42.

In the process of detecting the display disturbance state, when a state where it is determined that there is a display disturbance from the result of detection by the goods detection unit 41 has continued for a predetermined time period, it is determined that there is an arranging-required state. Also, in the process of detecting the display shortage state, when a state where it is determined that there is a shortage in the number of the goods from the result of detection by the goods detection unit 41 has continued for a predetermined time period, it is determined that there is a replenishment-required state. This goods state detection process will be described in detail later.

The person detection unit 43 executes a process of detecting the persons staying in the store based on based on the images of the interior of the store captured by the cameras 1. This person detection process may use known image recognition technology, namely, technology for extracting images of persons from the captured images and obtaining the positions of the persons, and the result of detection of the positions of the persons in the store is output from the person detection unit 43 for each detection time.

The person state detection unit 44 executes a process of detecting a person staying state in the store based on the result of detection by the person detection unit 43. In the present embodiment, the number of the persons staying in the payment areas and the number of the persons staying in each goods access area, namely, the number of persons staying in the payment areas or the goods access areas are counted at the same time, and the person state detection unit 44 outputs the number of the persons staying in the payment areas and the number of the persons staying in each goods access area separately for each detection time. It is to be noted that in this staying person counting process, one count is added when a person is continuously detected in each payment area or each goods access area for a predetermined detection period (e.g., three seconds).

The notification determination unit 45 executes a process of determining the propriety of a notification instructing the store staff member to perform a goods management work, based on the result of detection by the goods state detection unit 42, namely, the goods display state (display disturbance state and display shortage state) in each display area, and the result of detection by the person state detection unit 44, namely, the number of the persons staying in the payment areas and the number of the persons staying in each goods access area. In this notification determination process, based on the goods display state in each display area, a display area(s) that requires a goods management work is determined. Further, based on the number of the persons staying in the payment areas and the number of the persons staying in the goods access area corresponding to the display area that requires a goods management work, it is determined whether the goods management work is feasible, so that a notification is made when the goods management work is feasible. The procedure of this notification determination process will be described in detail later.

The notification unit 46 makes a notification instructing the store staff member to perform a goods management work in accordance with the result of determination by the notification determination unit 45. This notification is performed for each of the display disturbance state and the display shortage state. Namely, in the case of the display disturbance state (arranging-required state), a notification instructing the store staff member to perform a goods arranging work to resolve the display disturbance state is made (display disturbance alert), and in the case of the display shortage state (replenishment-required state), a notification instructing the store staff member to perform a goods replenishing work to resolve the display shortage state is made (display shortage alert). Such notification (display disturbance alert and display shortage alert) may be achieved by displaying a message in the screen on the monitor 4, but may also be outputted from an appropriate output device such as a loudspeaker or a lamp.

Incidentally, in the case where a person was staying in a goods access area, there is a high possibility that the arranging-required state or the replenishment-required state has occurred in the corresponding display area. Therefore, based on the number of persons staying in a goods access area, it is possible to estimate the goods display state in the display area corresponding to the goods access area, and the notification determination unit 45 may determine the propriety of a notification based on the result of estimation of the goods display state. In this case, a notification that is different from a notification based on the result of detection by the goods state detection unit 42, such as a notification that there is a possibility of occurrence of a display disturbance or a display shortage, may be made.

It is to be noted that the surveillance unit 31, the goods monitoring unit 32 and the analysis unit 33 are realized by executing programs for surveillance, goods monitoring and goods display state analysis by the CPU of the PC 3. These programs may be pre-installed in the PC 3 serving as an information processing device to embody a dedicated device, or may be provided to the user in the form stored in an appropriate program recording medium or through the network as an application program that can be run on a general purpose OS.

Next, description will be made of the determination of the display disturbance state and the display shortage state executed by the goods state detection unit 42 shown in FIG. 3. FIG. 4 is an explanatory diagram showing display states of goods in a display area (display shelf).

In the detection of a display disturbance state, a determination is made on whether there is a disturbance in the display of goods. Namely, a state with a display disturbance as shown in FIG. 4(A-1), in which the goods are placed only in an inner part of the display shelf, and a state without a display disturbance as shown in FIG. 4(A-2), in which the goods are arranged on the front row of the display shelf, are distinguished from each other. In the present embodiment, the state with a display disturbance shown in FIG. 4(A-1) is regarded as an arranging-required state, and in this case, a notification instructing the store staff member to perform a goods arranging work to resolve the display disturbance state is made (display disturbance alert).

It is to be noted that, in the example shown in FIG. 4, a case in which the appearance of the front side of the display shelf should be put in order was shown, but in a case where the display area is top-opened such as a bargain bin, it is necessary to resolve a disturbance in an overall display state, and therefore, the determination of the display disturbance state should be performed based on the overall display state of the goods.

Further, in the detection of a display disturbance state, it is possible to tolerate a certain degree of disturbance in the display, such that when the disturbance in the display is remarkable, it is determined that a display disturbance state is indicated and a notification is made. In this case, the degree of disturbance in the display may be quantified, so that the quantified degree of disturbance is compared with a predetermined threshold value to determine whether there is a display disturbance state.

In the detection of a display shortage state, a determination is made on whether there is a shortage in the goods displayed. Namely, an empty state as shown in FIG. 4(B-1), in which there is no goods on the display shelf, a shortage state as shown in FIG. 4(B-2), in which the goods on the display shelf are insufficient, and a sufficient state as shown in FIG. 4(B-3), in which a sufficient number of goods are displayed on the display shelf, are distinguished from each other. In the present embodiment, the empty state shown in FIG. 4(B-1) and the shortage state shown in FIG. 4(B-2) are regarded as a replenishment-required state, and in these cases, a notification instructing the store staff member to perform a goods replenishing work to resolve the shortage of the goods is made (display shortage alert).

Here, the distinction between the shortage state and the sufficient state can be made by comparing a shortage rate, namely, the percentage of shortage of goods, with a predetermined threshold value (e.g., 50%), such that when the shortage rate exceeds the predetermined threshold value, it is determined that the displayed goods are in a shortage state, while when the shortage rate does not reach the threshold value, it is determined that the displayed goods are in a sufficient state.

It is to be noted that in this example, the detection of a display shortage state classifies the display states into three states, but the present invention is not limited to this, and the display states may be classified into two states or more than three states.

Figure 5:
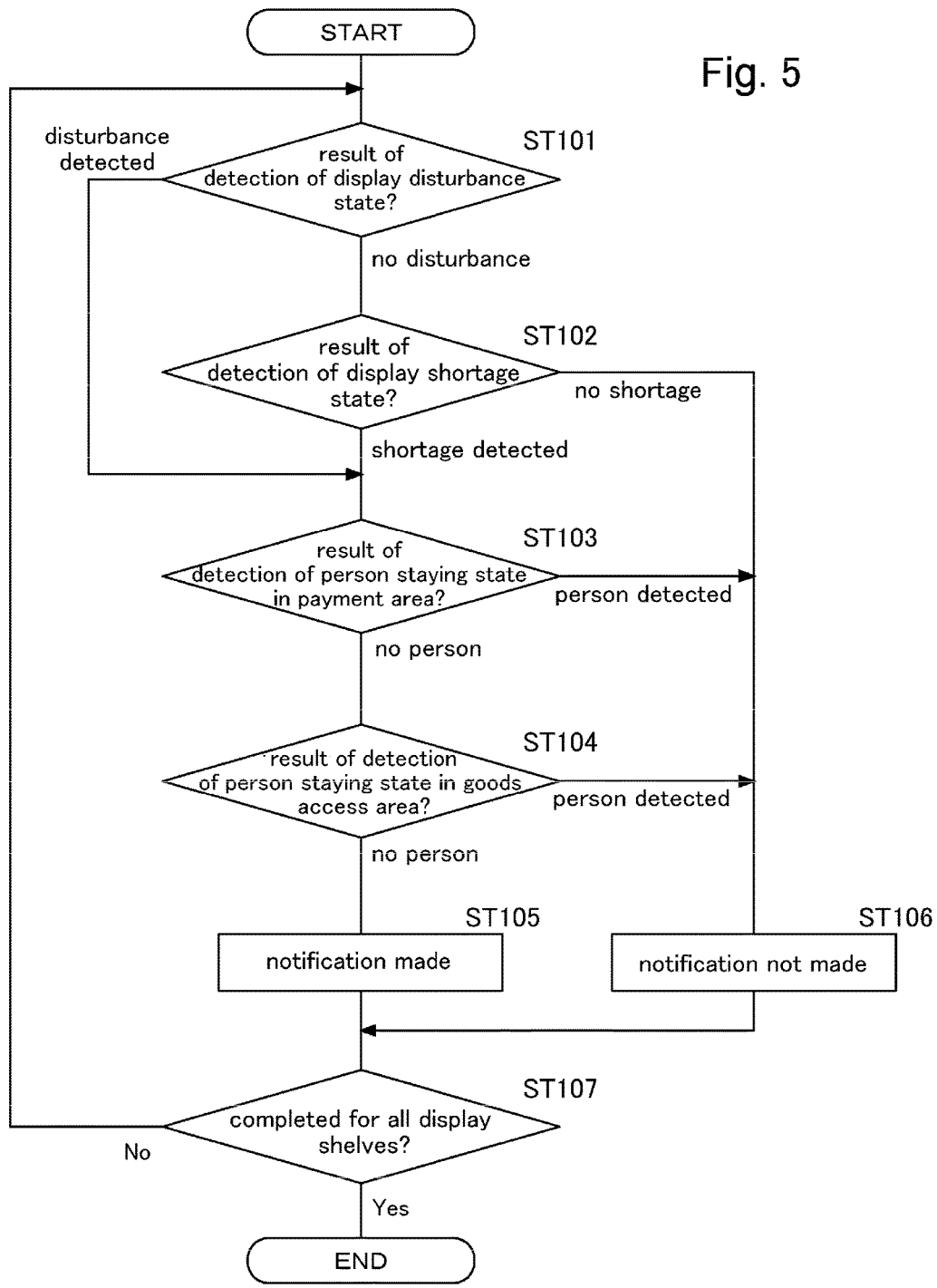
FIG. 5 is a flowchart showing a procedure of a notification determination process executed by a notification determination unit 45.
Figure 6:
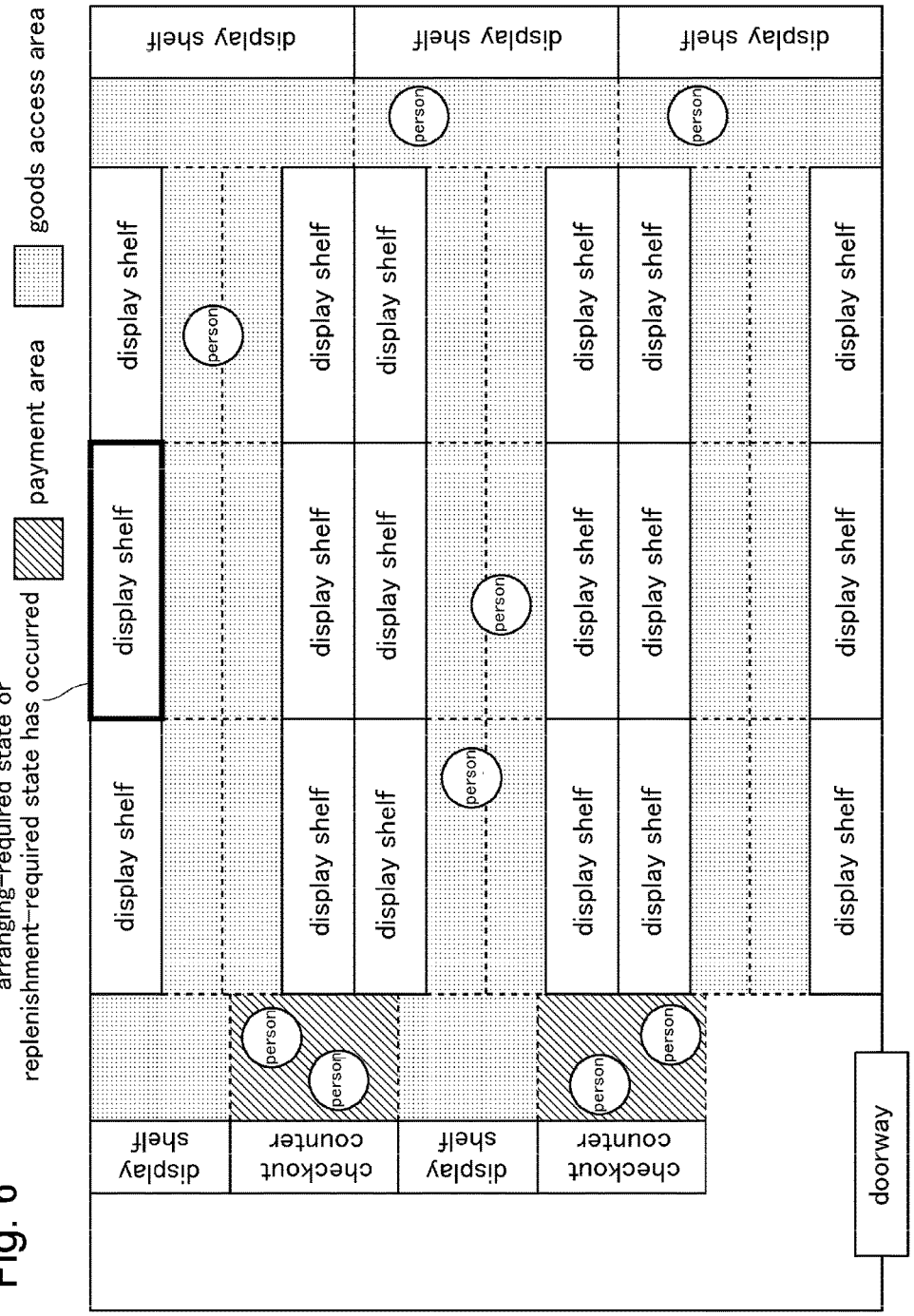
FIG. 6 is a plan view of the store showing an example of a person staying state.
Figure 7:
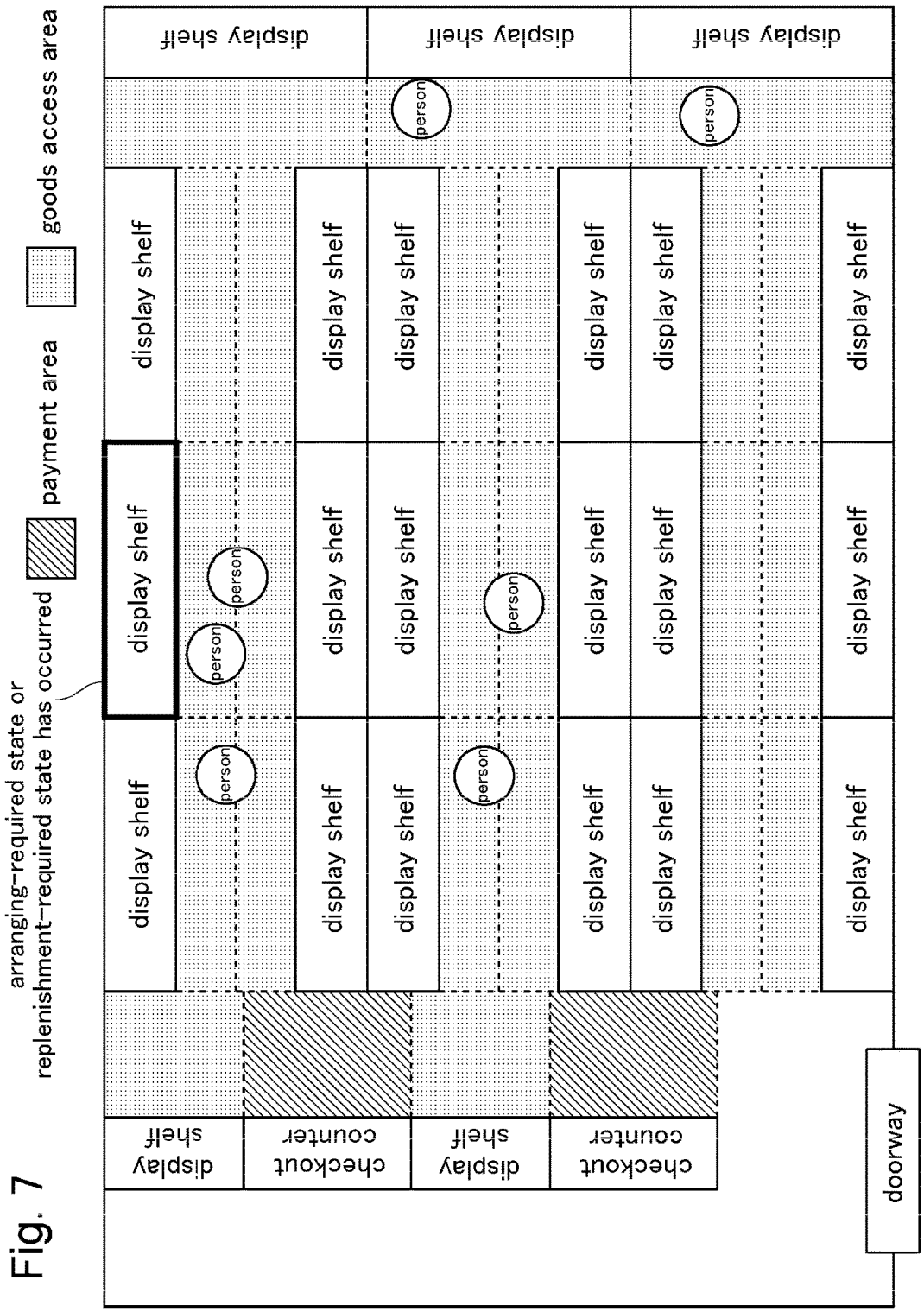
FIG. 7 is a plan view of the store showing an example of a person staying state.
Figure 8:
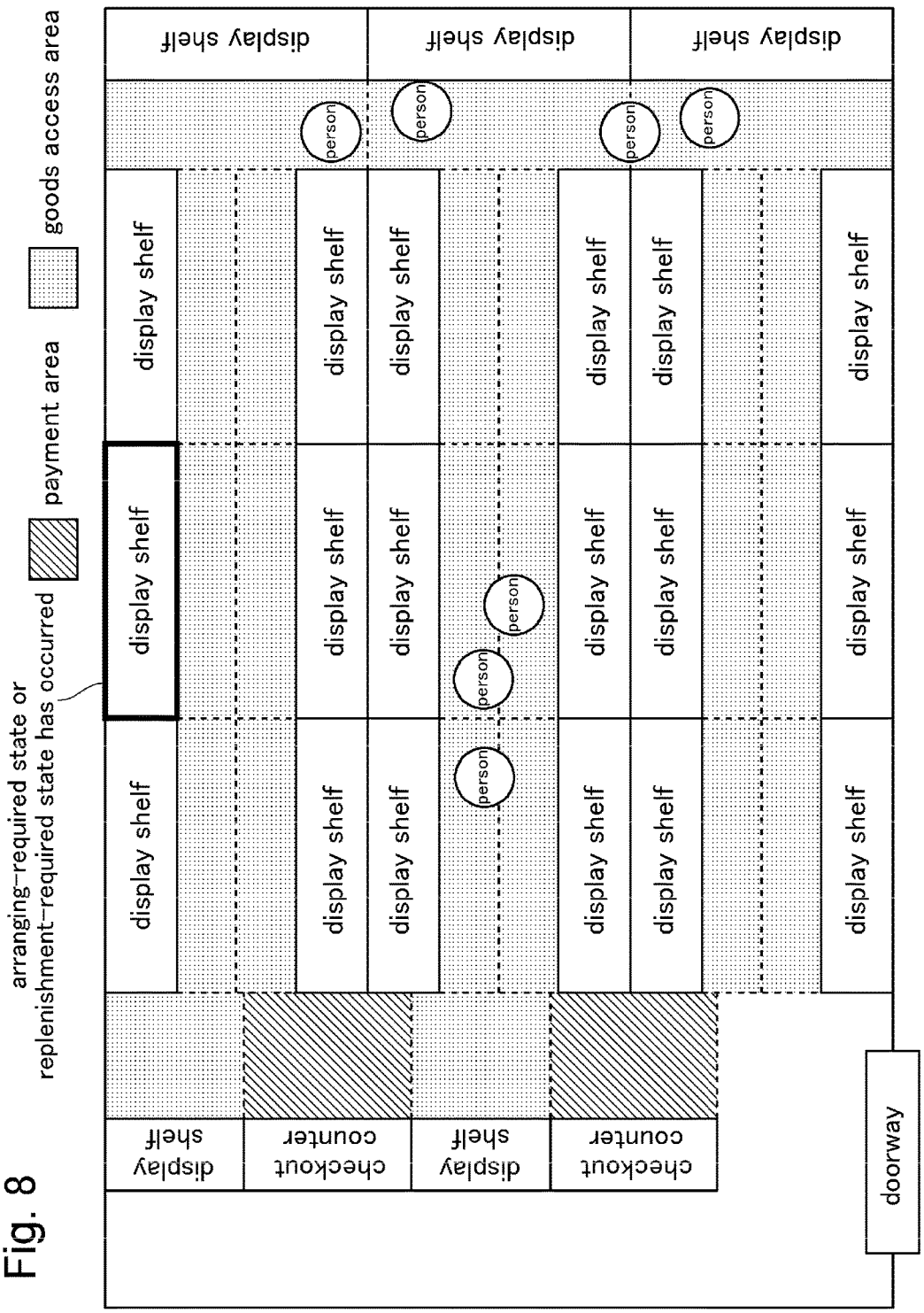
FIG. 8 is a plan view of the store showing an example of a person staying state.

Next, description will be made of the notification determination process executed by the notification determination unit 45 shown in FIG. 3. FIG. 5 is a flowchart showing a procedure of the notification determination process executed by the notification determination unit 45. FIGS. 6-8 are each a plan view of the store showing an example of a person staying state.

The notification determination unit 45 determines the propriety of a notification based on the result of detection by the goods state detection unit 42 and the result of detection by the person state detection unit 44 as described above. This notification determination is performed for each display area (display shelf) in the store in order, and as shown in FIG. 5, the propriety of a notification is determined (ST105, ST106) based on the result of detection of the display disturbance state by the goods state detection unit 42 (ST101), the result of detection of the display shortage state by the goods state detection unit 42 (ST102), the result of detection of the person staying state in the payment areas by the person state detection unit 44 (ST103), and the result of detection of the person staying state in each goods access area by the person state detection unit 44 (ST104). This is performed for each display shelf, and repeated until the determination is made for all display shelves.

Specifically, in a case where the result of detection of the display disturbance state (ST101) is "no display disturbance" or the result of detection of the display shortage state (ST102) is "no shortage" (sufficient state), obviously, the notification is not made (ST106).

Even when the result of detection of the display disturbance state (ST101) is "display disturbance detected" or the result of detection of the display shortage state (ST102) is "shortage detected" (empty state or shortage state), if the result of detection of the person staying state in the payment areas (ST103) is "person detected," the notification is not made (ST106).

For instance, the example shown in FIG. 6 illustrates a case where a disturbance has occurred in the display of the goods or a shortage has occurred in the number of the displayed goods in one display shelf, and the goods state detection unit 42 detects that the display shelf is in the arranging-required state or in the replenishment-required state. Further, there are persons staying near the checkout counters to make payment, and the persons staying in the payment areas are detected by the person state detection unit 44.

In this case, the store staff members are required to preferentially deal with the customers making payment at the checkout counters, and thus, cannot perform a goods management work. Therefore, even though there is a display shelf in the arranging-required state or in the replenishment-required state, a notification prompting a goods management work is not made.

Also, even when the result of detection of the display disturbance state (ST101) is "display disturbance detected" or the result of detection of the display shortage state (ST102) is "shortage detected," and the result of detection of the person staying state in the payment areas (ST103) is "no person," if the result of detection of the person staying state in the goods access area corresponding to the display shelf (ST104) is "person detected," the notification is not made (ST106).

For instance, the example shown in FIG. 7 illustrates a case where, similarly to the example shown in FIG. 6, a disturbance has occurred in the display of the goods or a shortage has occurred in the number of the displayed goods in one display shelf, and the goods state detection unit 42 detects that the display shelf is in the arranging-required state or in the replenishment-required state. Further, there is no person staying near the checkout counters to make payment, and thus, the person state detection unit 44 does not detect a person staying in the payment areas. However, there are persons in the goods access area corresponding to the display shelf detected to be in the arranging-required state or in the replenishment-required state, and accordingly, the person state detection unit 44 detects staying of persons in the goods access area.

In this case, performing a goods management work (goods arranging work or goods replenishing work) at the display shelf that is in the arranging-required state or in the replenishment-required state would interfere with the customers, and hence, the store staff member cannot perform the goods management work. Therefore, a notification prompting the goods management work is not made.

On the other hand, in a case where the result of detection of the display disturbance state (ST101) is "display disturbance detected" or the result of detection of the display shortage state (ST102) is "shortage detected," and the result of detection of the person staying state in the payment areas (ST103) is "no person," if the result of detection of the person staying state in the goods access area corresponding to the display shelf (ST104) is "no person," a notification instructing a goods management instruction is made (ST105).

For instance, the example shown in FIG. 8 illustrates a case where, similarly to the example shown in FIG. 6, a disturbance has occurred in the display of the goods or a shortage has occurred in the number of the displayed goods in one display shelf, and the goods state detection unit 42 detects that the display shelf is in the arranging-required state or in the replenishment-required state. Further, there is no person staying near the checkout counters to make payment, and thus, the person state detection unit 44 does not detect a person staying in the payment areas. Yet further, there is no person in the goods access area corresponding to the display shelf detected to be in the arranging-required state or in the replenishment-required state, and accordingly, the person state detection unit 44 does not detect staying of persons in the goods access area.

In this case, the store staff member can perform a goods management work (goods arranging work or goods replenishing work) at the display shelf that is in the arranging-required state or in the replenishment-required state without problems, and therefore, a notification prompting the goods management work is made.

It is to be noted that in the illustrated embodiment, the determination relating to the result of detection of the person staying state in the payment areas (ST103 in FIG. 5) and the determination relating to the result of detection of the person staying state in each goods access area (ST104 in FIG. 5) are made depending on the presence or absence of a person, such that if there is even a single person in the payment area or the goods access area, the notification is not made. However, it is also possible not to make a notification if the number of persons exceeds a predetermined threshold value that may be two or more. Further, because the situation may be different between the payment area and the goods access area, the threshold value for the number of persons may be changed between the payment area and the goods access area.

As described in the foregoing, in the present embodiment, the propriety of a notification instructing a goods management work is determined taking into account the person staying state in addition to the goods display state, and therefore, a notification can be made at an appropriate and effective timing. Namely, the necessity and feasibility of the goods management work can be determined based on the goods display state and the person staying state, and thus, by taking into account both the goods display state and the person staying state, a notification is made when the goods management work is necessary and feasible, whereby a notification can be made at an appropriate and effective timing.

Further, in the present embodiment, the person staying state in a payment area where a customer making payment stays is detected, and the notification is not made when the person staying state in the payment area is such a state that makes it difficult to perform the goods management work. Therefore, it is possible to avoid making an ineffectual notification when a goods management work is difficult to perform.

Further, in the present embodiment, the person staying state in the goods access area where a customer taking a look at the goods displayed in the display area stays is detected, and the notification is not made when the person staying state in the goods access area is such a state that makes it difficult to perform the goods management work in the goods access area. Therefore, it is possible to avoid making an ineffectual notification when a goods management work is difficult to perform.

Further, in the present embodiment, the person staying state in the payment area where a customer making payment stays and in the goods access area where a customer taking a look at the goods displayed in the display area is detected, and the notification is made when the goods display state is such a state that requires a goods management work, the person staying state in the payment area is not such a state that makes it difficult to perform the goods management work, and the person staying state in the goods access area is not such a state that makes it difficult to perform the goods management work in the goods access area. Therefore, a notification is made when the goods management work is necessary and not difficult to perform, thereby a notification can be made at an appropriate and effective timing.

Further, in the present embodiment, a display disturbance state and a display shortage state are detected as the goods display state, and a notification instructing a store staff member to perform, as the goods management work, an arranging work for resolving a disturbance in goods display and a replenishing work for resolving a shortage of goods is made, and therefore, when there is a defect in the display of goods, it is possible to make an appropriate notification in accordance with the content of the defect. Thereby, the store staff member is allowed to swiftly perform an appropriate goods management work in accordance with the content of the notification.

Next, description will be made of the goods display state analysis process executed by the analysis unit 33 of the PC 3 shown in FIG. 3.

The analysis unit 33 of the PC 3 is configured to perform an analysis on the goods display state, and includes an information storage unit 51, an aggregation unit 52 and a GUI control unit 53.

The information storage unit 51 stores notification generation information relating to the generation times of the notification (display disturbance alert and display shortage alert) made by the notification unit 46. Further, the information storage unit 51 stores the detection result of the goods display state (display disturbance state and display shortage state) at each detection time acquired by the goods state detection unit 42. Also, the information storage unit 51 stores the number of staying persons at each detection time obtained by the person state detection unit 44.

The aggregation unit 52 includes a goods state aggregation unit 54 and a person state aggregation unit 55.

The goods state aggregation unit 54 executes a process of aggregating, for each predetermined aggregation period (e.g., time slot, day, month), the detection result of the goods display state (display disturbance state and display shortage state) at each detection time stored in the information storage unit 51 to thereby acquire the goods display state for each aggregation period. This aggregation process is executed with respect to each of the display disturbance state and the display shortage state.

There are various ways for executing the process of aggregation of the goods display states, and for example, it is possible to give priority to a state that poses a larger problem on the goods management, and to determine the goods display state for each aggregation period accordingly. Namely, in the aggregation process with respect to the display disturbance state, priority is given to a display disturbance state than a normal state, such that when a display disturbance state is detected during a certain aggregation period, the state for the aggregation period is determined to be a display disturbance state, while when no display disturbance state is detected during a certain aggregation period, the state for the aggregation period is determined not to be a display disturbance state. Further, in the aggregation process with respect to the display shortage state, priority is given to a state with a larger degree of shortage, such that when an empty state is detected during a certain aggregation period, the state for the aggregation period is determined to be an empty state, when an empty state is not detected and a shortage state is detected during a certain aggregation period, the state for the aggregation period is determined to be a shortage state, and when neither an empty state nor shortage state is detected during a certain aggregation period, the state for the aggregation period is determined to be a sufficient state.

Further, in the process of aggregation of the goods display states, it is also possible to average the results of detection of the goods display state over each aggregation period. For example, the goods display state for each aggregation period may be determined based on the temporal ratio between the detected states. Namely, in the aggregation process with respect to the display disturbance state, the temporal ratio between the display disturbance state and the normal state during each aggregation period is obtained, and the goods display state for each aggregation period is acquired based on the temporal ratio. Further, in the aggregation process with respect to the display shortage state, the temporal ratio between the empty state, shortage state and sufficient state during each aggregation period is obtained, and the goods display state for each aggregation period is acquired based on the temporal ratio.

The person state aggregation unit 55 executes a process of aggregating, for each predetermined aggregation period (e.g., time slot, day, month, etc.), the number of staying persons at each detection time stored in the information storage unit 51 to thereby acquire the number of staying persons for each aggregation period. The person state detection unit 44 obtains the number of staying persons at each detection time for each goods access area, and thus, by totaling it, it is possible to acquire the number of persons staying in the entire store.

The GUI control unit 53 executes a process of acquiring input information entered by an input operation of the user through a GUI (Graphical User Interface) using a monitor 4 and an input device (input unit) 6 such as a mouse and a process of outputting the analysis result on the state of movement of persons, and includes an input information acquisition unit 56 and a screen generation unit (display information generation unit) 57.

The screen generation unit 57 executes a process of generating display information relating to an analysis result output screen relating to the state of generation of the notification and the goods display state, such that the analysis result output screen is displayed on the monitor 4. The input information acquisition unit 56 executes a process of acquiring input information in response to an input operation performed by the user using the input device 6 on the analysis result output screen displayed on the monitor 4. Based on the input information acquired by the input information acquisition unit 56, a condition for the analysis process executed by the analysis unit 33 is set.

Specifically, the screen generation unit 57 executes a process of generating, based on the information acquired by the goods state aggregation unit 54 and the person state aggregation unit 55, display information relating to an analysis result output screen for showing, in an integrated manner, the temporal transition of the goods display state, the state of generation of the notification and the temporal transition of the person staying state over a given period of interest (see FIG. 9 and FIG. 10), and the analysis result output screen is displayed on the monitor 4.

Further, the screen generation unit 57 executes a process of generating, based on the information acquired by the goods state aggregation unit 54 and the person state aggregation unit 55, display information relating to an analysis result output screen for showing the goods display state for each aggregation period separately for each display area (see FIG. 11), an analysis result output screen for showing the goods display states aggregated for varying aggregation periods in an arrangement (see FIG. 12), and an analysis result output screen for showing the goods display state and the number of staying persons for each aggregation period in an arrangement (see FIG. 13), such that these analysis result output screens are displayed on the monitor 4.

Figure 9:
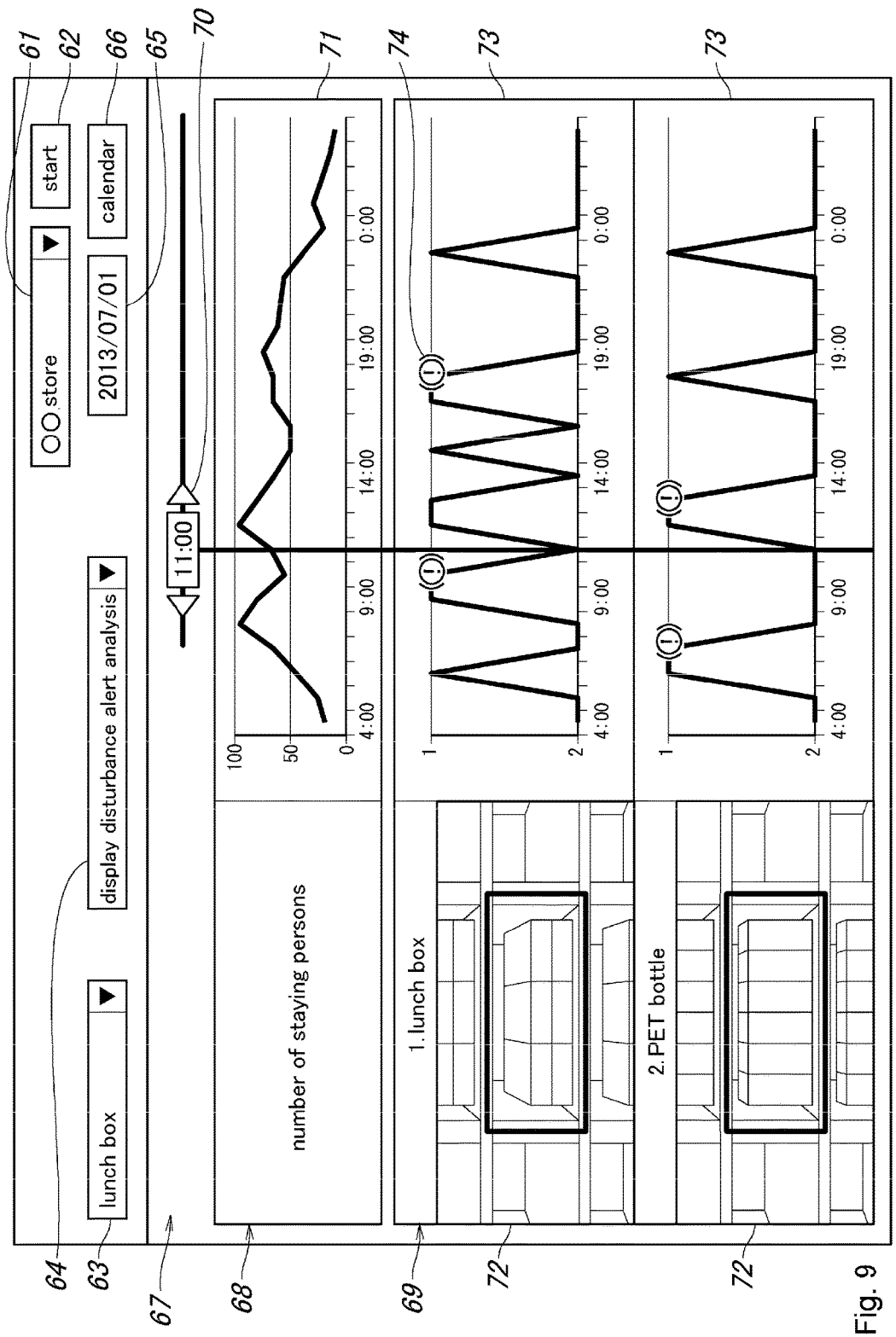
FIG. 9 is an explanatory diagram showing an analysis result output screen relating to a state of generation of a notification.
Figure 10:
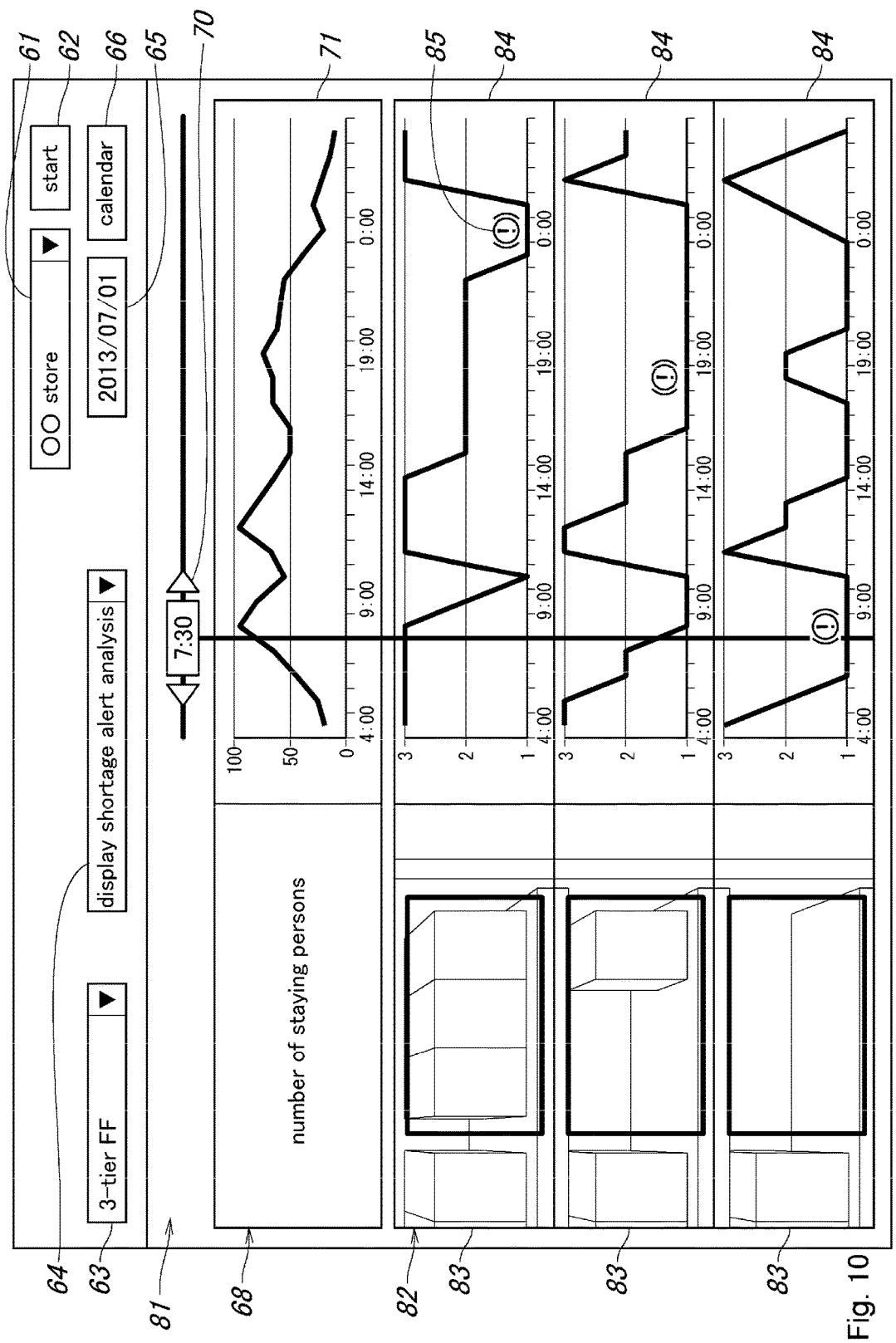
FIG. 10 is an explanatory diagram showing an analysis result output screen relating to a state of generation of a notification.

Next, description will be made of the analysis result output screen to be displayed on the monitor 4 shown in FIG. 3, particularly, the analysis result output screen relating to the state of generation of notification. FIG. 9 and FIG. 10 are each an explanatory diagram showing an analysis result output screen relating to the state of generation of the notification.

The analysis result output screen shown in FIG. 9 pertains to the state of generation of the display disturbance alert, namely, the notification instructing a store staff member to perform a goods arranging work to resolve an arranging-required state (a state in which there is a disturbance in the display of goods) when such a state has occurred.

This analysis result output screen is provided with a store selection section 61, a start button 62, a display area selection section 63, an analysis result selection section 64, a date display section 65, a calendar button 66 and an analysis result display section 67.

The store selection section 61 is provided to select a store from a pulldown menu. The start button 62 is provided to causing the analysis unit 33 to start the analysis process. The display area selection section 63 is provided to select a display area from a pulldown menu.

The analysis result selection section 64 is provided to select an analysis result from a pulldown menu. In the present embodiment, it is possible to select an analysis result relating to the state of generation of the display disturbance alert, an analysis result relating to the state of generation of the display shortage alert, an analysis result relating to the display disturbance state, an analysis result relating to the display shortage state, etc., and an output screen for each analysis result is displayed on the monitor 4. Specifically, in the example shown here, "display disturbance alert analysis" is selected, and the analysis result relating to the state of generation of the display disturbance alert is displayed in the analysis result display section 67.

The date display section 65 is provided to display a date, and the calendar button 66 is provided to select the date. Upon operation of the calendar button 66, a calendar screen is displayed, and when a date is selected thereon, the selected date is displayed in the date display section 65 and the analysis result on the selected date is displayed in the analysis result display section 67.

The analysis result display section 67 is provided with a staying person number display section 68, an alert generation state display section 69 and a display time manipulation section 70.

The staying person number display section 68 is provided with a graph display section 71, in which a temporal transition of the number of persons staying in the entire store is shown as a graph (line graph). In this graph, the horizontal axis indicates time slots, and the vertical axis indicates the number of staying persons. The number of staying persons in this graph is a number of staying persons for each time slot acquired by the aggregation performed by the person state aggregation unit 55 regarding each time slot as the aggregation period. This enables the user to grasp the temporal transition of the number of the persons staying in the store.

The alert generation state display section 69 is provided with an image display section 72 and a graph display section 73 for each of the display areas. Specifically, in this example, a display shelf for lunch boxes and a display shelf for PET bottles are selected as the display areas. The image display section 72 displays an image of the display area. Further, in this image display section 72, a frame image indicating a detection area in the display area is displayed.

In the graph display section 73, a temporal transition of the display disturbance state is shown as a graph (line graph). In this graph, the horizontal axis indicates time slots, and the vertical axis indicates the display disturbance state. The display disturbance state in this graph is a goods display state for each time slot acquired by the goods state aggregation unit 54 by regarding each time slot as the aggregation period, and becomes "1" when there is a disturbance in the display of goods and becomes "2" when there is no disturbance in the display of goods.

Further, in the graph display section 73, alert marks 74 each indicating a generation time of the display disturbance alert are shown. Thereby, the user can grasp at what timing the display disturbance alert was generated while comparing it with the temporal transition of the display disturbance state.

The display time manipulation section 70 is provided to adjust the time of the image of the display area displayed in the image display section 72. By manipulating the display time manipulation section 70, it is possible to switch the image of the display area to the image at a desired time. This makes it possible to check the actual state of the display area at a desired time, such as the time at which the display disturbance alert was generated, with the image displayed in the image display section 72.

In this analysis result output screen, it is possible to check the state of generation of the display disturbance alert while comparing it with the number of staying persons. Presence of a defect in the display of goods store while there are may customers visiting the store is particularly of issue because it would lead to a loss of sales opportunity or reduction in customer satisfaction, but by checking the state of generation of the display disturbance alert while checking it with the number of staying persons by use of this analysis result output screen, it is possible to recognize the problems relating to the goods management in the store.

It is to be noted that in the present embodiment, a plurality of detection areas may be set in one display area (display shelf). For example, a display shelf may be divided into an upper tier, a middle tier and a lower tier and a detection area may be set for each of them. In this case, the goods state detection unit 42 detects the goods display state for each detection area, the notification determination unit 45 determines the propriety of a notification for each detection area, and the notification unit 46 makes a notification for each detection area.

Further, in the case where a plurality of detection areas are set in one display area, it is possible to show the analysis result for each detection area, as in the analysis result output screen shown in FIG. 9. It is to be noted that, in the example shown in FIG. 9, the image display section 72 and the graph display section 73 show the images and graphs for a corresponding detection area, but it is possible to display a plurality of detection areas in the image display section 72 and to display the graphs for the respective detection areas in an arrangement in the graph display section 73. It may be also possible to display the graphs for the respective detection areas in different colors such that they overlap one another in the graph display section 73.

The analysis result output screen shown in FIG. 10 pertains to the state of generation of the display shortage alert, namely, the notification instructing a store staff member to perform a goods replenishing work to resolve a replenishment-required state (empty state and shortage state) when such a state has occurred.

This analysis result output screen is displayed when "display shortage alert analysis" is selected in the analysis result selection section 64. This analysis result output screen is the same as the analysis result output screen shown in FIG. 9, except for an alert generation state display section 82 of an analysis result display section 81.

The alert generation state display section 82 is provided with an image display section 83 and a graph display section 84 for each of a plurality of detection areas set in a display area. The image display section 83 displays an image of the corresponding detection area. Particularly, in this embodiment, a display shelf for fast foods is selected as the display area.

In the graph display section 84, a temporal transition of the display shortage state is shown as a graph (line graph). In this graph, the horizontal axis indicates time slots, and the vertical axis indicates the display shortage state. The display shortage state in this graph is a display shortage state for each time slot acquired by the goods state aggregation unit 54 by regarding each time slot as the aggregation period, and becomes "1" when the state is the empty state, becomes "2" when the state is the shortage state, and becomes "3" when the state is the sufficient state.

Further, in the graph display section 84, alert marks 85 each indicating a generation time of the display shortage alert are shown. Thereby, the user can grasp at what timing the display shortage alert was generated while comparing it with the temporal transition of the display shortage state.

Figure 11:
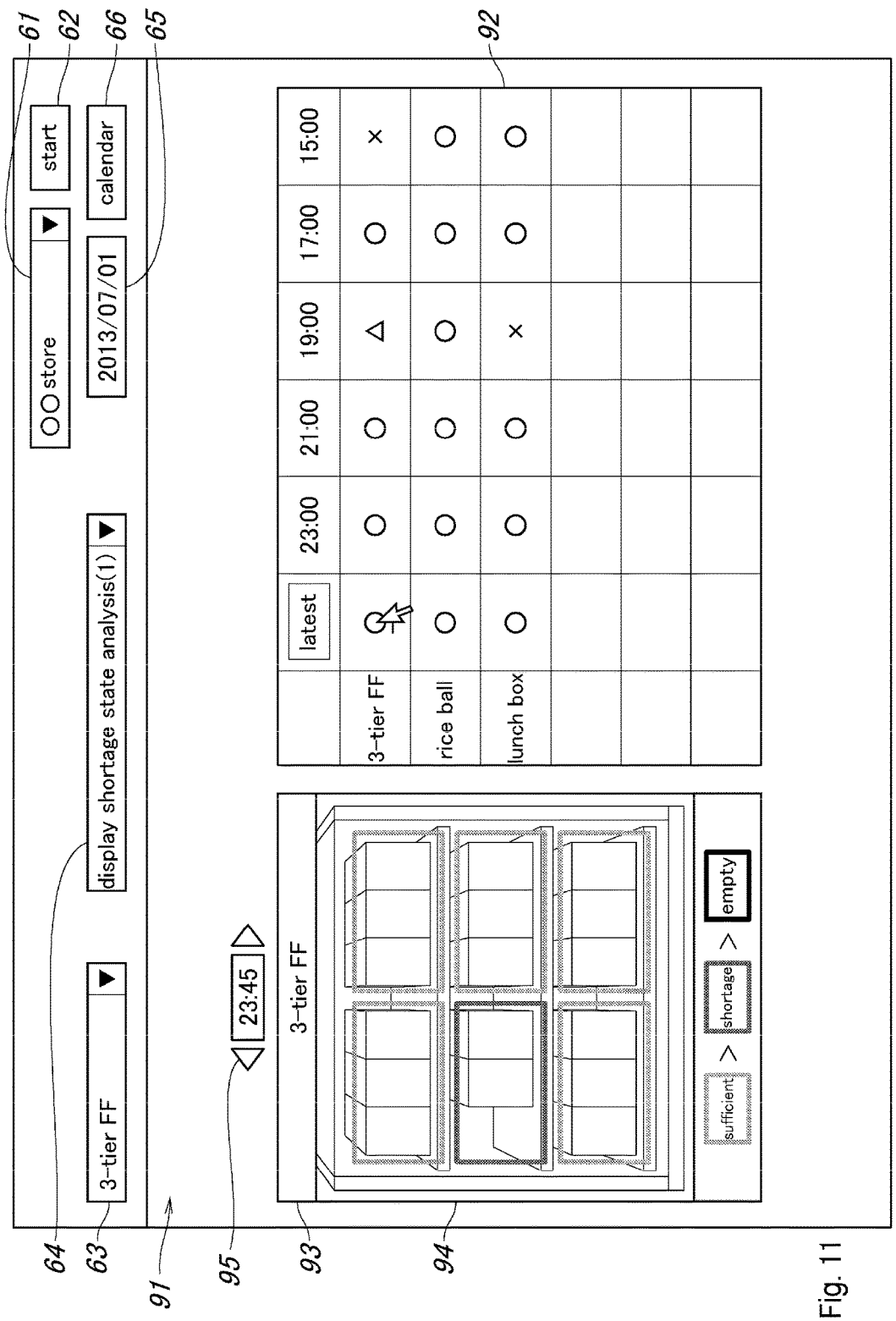
FIG. 11 is an explanatory diagram showing an analysis result output screen relating to a display shortage state.
Figure 12:
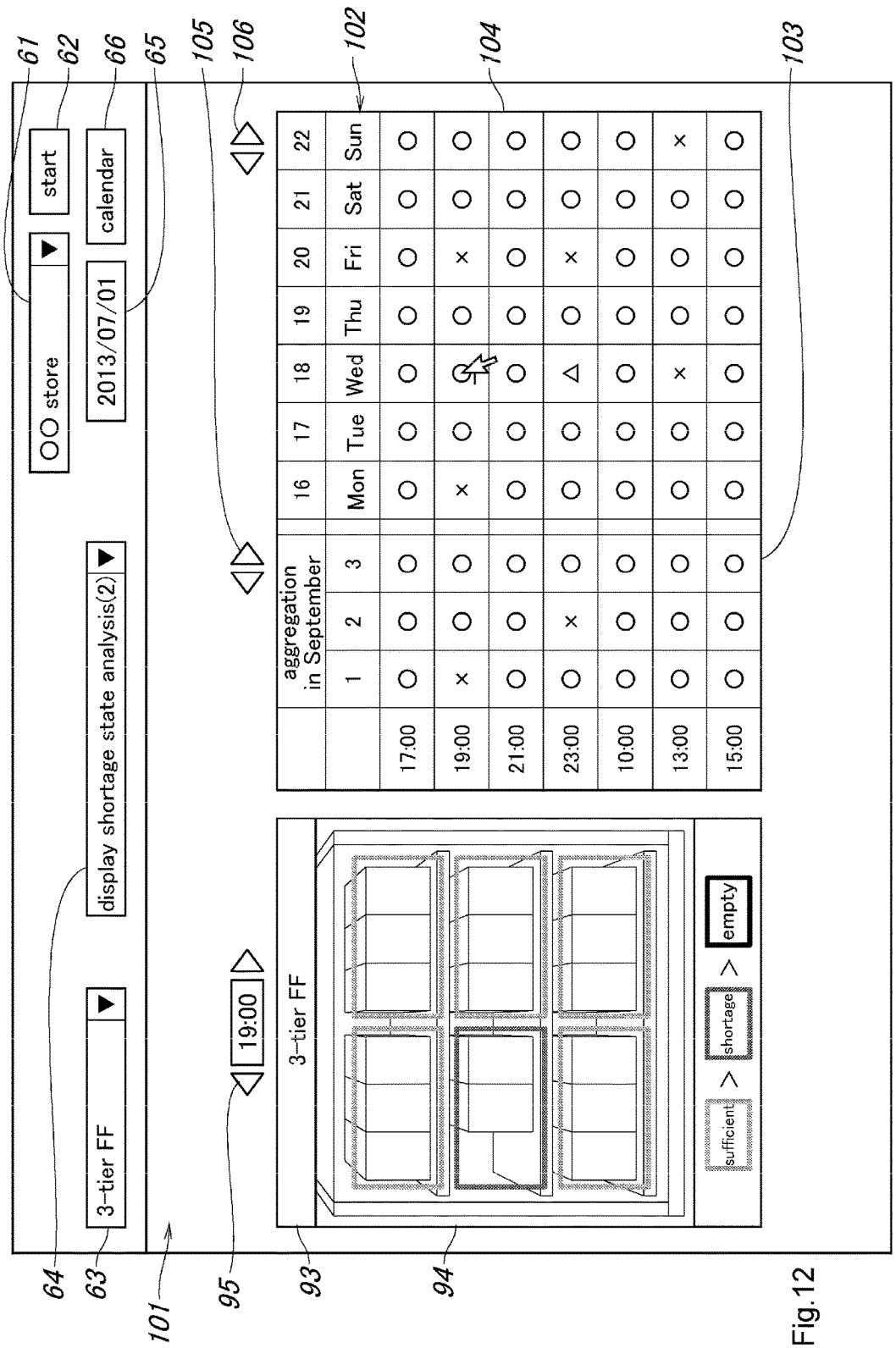
FIG. 12 is an explanatory diagram showing an analysis result output screen relating to a display shortage state.
Figure 13:
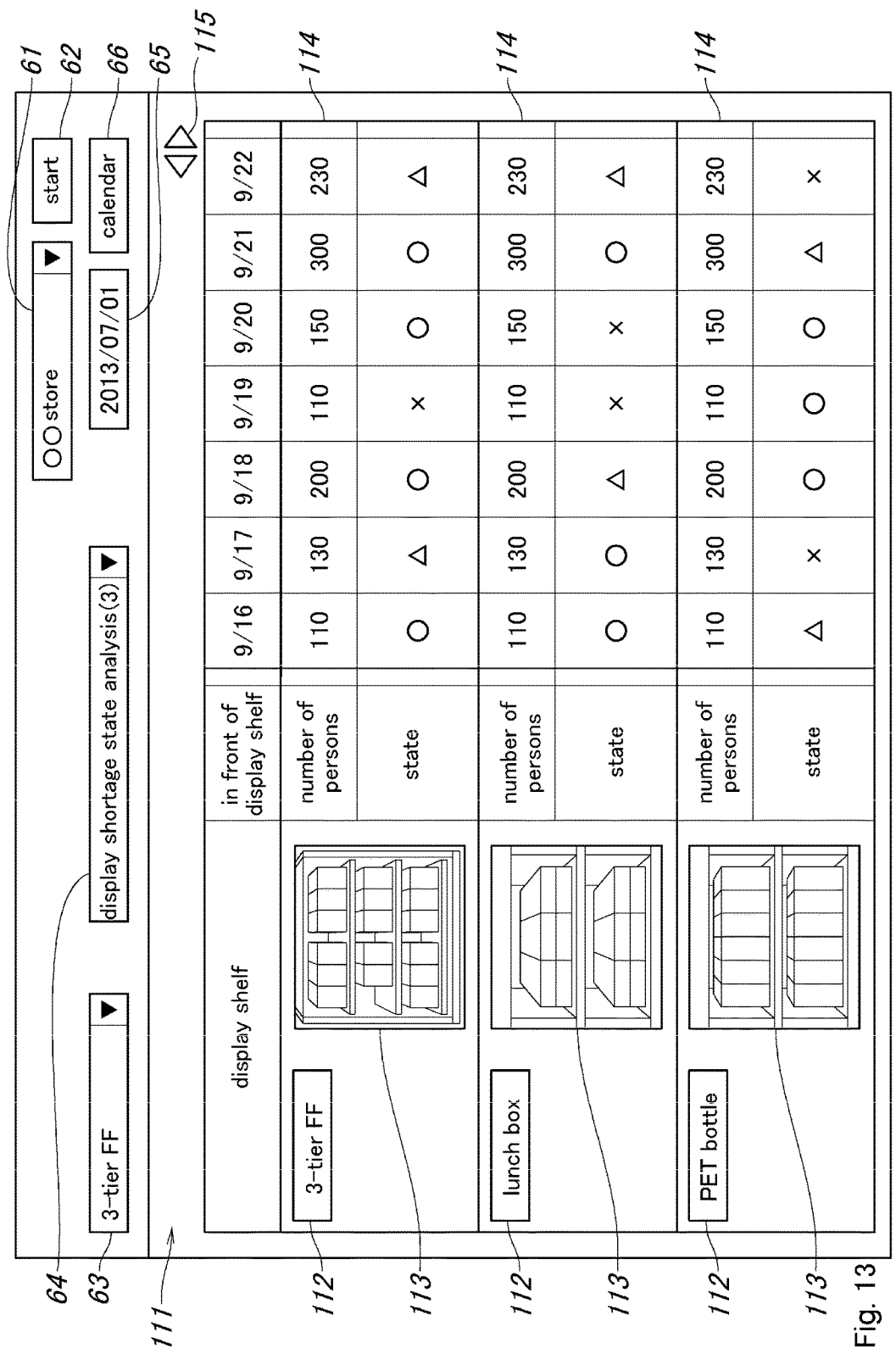
FIG. 13 is an explanatory diagram showing an analysis result output screen relating to a display shortage state.

Next, description will be made of the analysis result output screen relating to the goods display state, particularly to the display shortage state. FIG. 11, FIG. 12 and FIG. 13 are each an explanatory diagram showing an analysis result output screen relating to the display shortage state.

The analysis result output screen shown in FIG. 11 is designed to show the result of aggregation of the display shortage states for each display area, and is displayed when "display shortage state analysis (1)" is selected in the analysis result selection section 64. This analysis result output screen is the same as the analysis result output screen shown in FIG. 9, except for an analysis result display section 91.

The analysis result display section 91 is provided with a table display section 92, a display area name display section 93, an image display section 94 and a display time manipulation section 95. The image display section 94 displays an image of a display area. Further, in this image display section 94, frame images indicating the detection areas in the display area are displayed. Each frame image is displayed in varying colors depending on the empty state, shortage state or sufficient state. Thereby, the user can grasp at a glance the display shortage state for each detection area in the display area. The display time manipulation section 95 is provided to adjust the time of the image of the display area displayed in the image display section 94.

In the table display section 92, evaluation marks (○, ∆ and ×) relating to the display shortage states for respective time slots are displayed for each display area in the form of a table. Specifically, in the example shown here, evaluation marks for the latest time slot are displayed in the table display section 92 in addition to the evaluation marks for the time slots on the designated date. Further, a display shelf for fast foods (3-tier FF), a display shelf for rice balls and a display shelf for lunch boxes are selected as the display areas.

The evaluation marks are determined based on the display shortage states for the respective aggregation periods acquired by the goods state aggregation unit 54, and specifically, in the example shown here, indicate the empty state, shortage state and sufficient state, where the mark is "×" when the state is the empty state, "Δ" when the state is the shortage state, and "○" when the state is the sufficient state. Further, in the example shown here, the evaluation marks represent the display shortage states for the respective time slots acquired by the aggregation performed by the goods state aggregation unit 54 by regarding each time slot as the aggregation period.

When an evaluation mark is clicked by use of a mouse or the like, the image displayed in the image display section 94 is switched to the image of the corresponding display area and time slot. Specifically, in the example shown here, an evaluation mark for the display shelf for fast foods (3-tier FF) is selected, and an image of the display shelf for fast foods at the latest time (23:45) is displayed in the image display section 94. If, in this state, an evaluation mark for the display shelf for lunch boxes or the display shelf for rice balls is selected, an image of the display shelf for lunch boxes or the display shelf for rice balls will be displayed in the image display section 94.

With this analysis result output screen, the user can grasp the transition of the display shortage state depending on the time slots on a particular date. Further, the user can grasp the difference in the display shortage state for each time slot between different display areas.

The analysis result output screen shown in FIG. 12 shows the result of aggregation of the display shortage states, with the aggregation period being the time slots, for each week of each month and for each day of each week, and is displayed when "display shortage state analysis (2)" is selected in the analysis result selection section 64. This analysis result output screen is the same as the analysis result output screen shown in FIG. 11, except for a table display section 102 of an analysis result display section 101.

The table display section 102 is provided with a monthly aggregation display section 103 and a weekly aggregation display section 104. The monthly aggregation display section 103 shows the evaluation marks (Ω, Δ and ×) relating to the display shortage states for respective time slots for each week of each month in the form of a table. The evaluation marks in this monthly aggregation display section 103 are determined based on the display shortage states for the respective weeks acquired by the aggregation performed by the goods state aggregation unit 54 by regarding each week as the aggregation period.

The weekly aggregation display section 104 shows the evaluation marks (○, Δ and ×) relating to the display shortage states for respective time slots for each day of each week in the form of a table. The evaluation marks in this weekly aggregation display section 104 are determined based on the display shortage states for the respective time slots acquired by the aggregation performed by the goods state aggregation unit 54 by regarding each time slot as the aggregation period.

Further, the analysis result display section 101 is provided with scroll buttons 105, 106 respectively corresponding to the monthly aggregation display section 103 and the weekly aggregation display section 104, such that by manipulating these scroll buttons 105, 106, it is possible to shift the weeks displayed in the monthly aggregation display section 103 and the days displayed in the weekly aggregation display section 104.

This analysis result output screen enables the user to grasp the display shortage states of the designated display area for respective time slots for each week of each month and for the respective time slots for each day of each week.

It is to be noted that in the analysis result output screens shown in FIG. 11 and FIG. 12, it is possible to display the number of staying persons for each aggregation period in the analysis result display section. 91 to make it possible to compare the display shortage state and the number of staying persons for each aggregation period with each other.

The analysis result output screen shown in FIG. 13 is designed to show the display shortage state in comparison with the person staying state, and is displayed when "display shortage state analysis (3)" is selected. This analysis result output screen is the same as the analysis result output screen shown in FIG. 9 except for an analysis result display section 111.

This analysis result display section 111 is provided with a display area name display section 112, an image display section 113 and a table display section 114 for each of the display areas (display shelves). The display area name display section 112 displays the name of the display area. The image display section 113 displays an image of the display area.

In the table display section 114, numbers of staying persons and evaluation marks are displayed for each day. Each number of staying persons is a number of persons staying in a goods access area corresponding an associated display area, which is acquired by the aggregation performed by the person state aggregation unit 55 by regarding each single day as the aggregation period. Each evaluation mark represents the result of aggregation obtained by the aggregation performed by the goods state aggregation unit 54 by regarding each single day as the aggregation period.

Further, the analysis result display section 111 is provided with a scroll button 115, such that by manipulating the scroll button 115, it is possible to shift the days displayed in the table display section 114.

This analysis result output screen makes it possible to check the display shortage state of each display area for each day while comparing it with the number of staying persons.

It is to be noted that though FIGS. 11, 12 and 13 showed analysis result output screens relating to the display shortage state, it is possible to display similar analysis result output screens relating to the display disturbance state.

Further, the goods state aggregation unit 54 may make an evaluation by taking into account the necessity of the notification (display disturbance alert and display shortage alert). Namely, the goods state aggregation unit 54 may aggregate the results of determination by the notification determination unit 45 for each predetermined aggregation period, acquire evaluation information relating to the goods display state (display disturbance state and display shortage state) for each aggregation period, and determine the evaluation marks based on this evaluation information.

As described above, in the present embodiment, information relating to the goods display state at each detection time and information relating to the notification are stored, a result of aggregation relating to a temporal transition of the goods display state and a state of generation of the notification is acquired based on the stored information, and display information for displaying the result of aggregation is generated. Therefore, the user can grasp at what timing the notification was generated while comparing it with the temporal transition of the goods display state.

Further, in the present embodiment, a display disturbance state and a display shortage state are detected as the goods display state, and, in accordance with an input operation by a user, an input information for selecting a type of notification (display disturbance alert and display shortage alert) corresponding to each of the display disturbance state and the display shortage state is acquire. Further, a result of aggregation relating to the state of generation of the notification of the type selected by the user is acquired based on the input information, and display information relating to the result of aggregation is generated. Therefore, the user can grasp, for each type of the notification, at what timing the notification was generated while comparing it with the temporal transition of the goods display state. Thereby, it is possible to examine the problems relating to the goods management in the store in accordance with the type of the notification, namely, in accordance with the content of the defect in the goods display.

Further, in the present embodiment, a number of staying persons at each detection time is acquired as the person staying state, and the number of staying persons at each detection time is stored. Further, a result of aggregation relating to a temporal transition of the person staying state is acquired based on the stored information, and display information that integrates the temporal transition of the person staying state with the temporal transition of the goods display state and the state of generation of the notification is generated based on the result of aggregation. Therefore, the user can grasp the state of generation of the notification while comparing it with the temporal transition of the number of the persons staying in the store. Thereby, it is possible to recognize the problems relating to the goods management in the store.

Further, in the present embodiment, the result of detection of the goods display state at each detection time is stored, and the stored detection result at each detection time is aggregated for each predetermined aggregation period, such that a goods display state for each aggregation period is acquired, and display information relating to the goods display state for each aggregation period is generated. Therefore, the user can grasp the goods display state for each aggregation period. Further, by comparing the goods display states for different aggregation periods with each other, the user can grasp the difference in the goods display state between different aggregation periods.

Second Embodiment

FIG. 14 is an overall configuration diagram of a goods monitoring system according to the second embodiment of the present invention. In this embodiment, the features other than those particularly mentioned are the same as those of the first embodiment.

In this second embodiment, an inventory management device 121, a sales information management device 122 and a staff assignment management device 123 are provided in the store in addition to the PC 3 serving as a goods monitoring device. It is to be noted that at least one of the inventory management device 121, the sales information management device 122 and the staff assignment management device 123 may be integrated in the PC 3. Further, an inventory management server 125, a sales information management server 126 and a staff assignment management server 127 are provided in the head office.

The notification determination unit 45 of the goods monitoring unit 32 in the PC 3 executes a process of determining the propriety of a notification based on at least one of inventory information obtained from the inventory management device 121, sales information obtained from the sales information management device 122 and staff assignment information obtained from the staff assignment management device 123, in addition to the result of detection by the goods state detection unit 42 and the result of detection by the person state detection unit 44.

Specifically, when there are no goods in stock according to the inventory information, the display shortage alert is not issued even if the goods state detection unit 42 detects the replenishment-required state (empty state and shortage state) because it would not be possible to replenish the goods if the display shortage alert were issued. Further, when there is only one store staff member in the store according to the staff assignment information, the display disturbance alert and the display shortage alert are not issued because it is difficult to perform a goods management work (arranging work and replenishing work). Further, when it is confirmed based on the sales information that a good(s) was sold, there is a high possibility that the display area relating to the good(s) is in the replenishment-required state, and hence, the propriety of the display shortage alert is determined taking into account the result of detection by the goods state detection unit 42.

As described above, in this embodiment, the propriety of a notification is determined by taking into account the inventory state, sales state, assignment state of the store staff in the store, etc. based on the inventory information, sales information and store staff assignment information, in addition to the result of detection by the goods state detection unit 42 and the result of detection by the person state detection unit 44, and therefore, a notification can be made at an even more appropriate and effective timing.

In the foregoing, the present invention has been described in terms of specific embodiments thereof. However, these embodiments are provided for illustrative purposes and the present invention is not limited by the embodiments. It is also to be noted that not all of the structural elements of the goods monitoring device, goods monitoring system and goods monitoring method of the present invention shown in the above embodiments are necessarily indispensable, and they may be selectively used as appropriate at least within the scope of the present invention.

For example, in the above embodiments, the display shelves were regarded as display areas as shown in FIG. 2. However, the display areas are not limited to display shelves, and a piece of furniture such as a bargain bin or display table also may be regarded as a display area.

Further, in the above embodiments, both the display disturbance state and the display shortage state were detected as the goods display state, but only one of the display disturbance state and the display shortage state may be detected.

Further, in the above embodiments, the propriety of a notification was determined based on the person staying state in the payment area and the goods access area, the propriety of a notification may be determined based on the person staying state in the entire store which is a monitored area. In this case, the person state detection unit 44 may acquire the number of the persons staying in the store, such that a notification will not be made when the store is congested.

Further, in the above embodiments, the cameras 1 were each embodied as an omnidirectional camera using a fish-eye lens to have a view range of 360 degrees, as shown in FIG. 2. However, a camera having a predetermined angle of view, namely, a so-called box camera, may also be used.

Further, though in the above embodiments, the processes necessary for goods monitoring were executed by the PC 3 set up at the store, the necessary processes may be executed by the PC 11 set up at the head office or a cloud computer 21 forming a cloud computing system, as shown in FIG. 1. Further, the necessary processes may be executed by cooperation of multiple information processing devices, such that the multiple information processing devices communicate information with each other via a communication medium such as an IP network or LAN. In this case, the multiple information processing devices jointly executing the necessary processes constitute a customer management system.

In such a configuration, it is preferred that a device set up at the store be configured to execute at least goods detecting process and the person detection process. Thereby, an amount of data required for the remaining processes can be small, and therefore, even if the remaining processes are performed by an information processing device set up at a place other than the store, such as the PC 11 set up at the head office, the communication load can be small, and thus, it is easy to operate the system in the form of a wide area network.

It is also possible to configure the cloud computer 21 to perform at least processes requiring a large amount of computation, such as goods detecting process and the person detection process, of the processes necessary for the goods monitoring. In this configuration, since the cloud computer 21 performs the processes requiring a large amount of computation, it is not necessary to prepare a high-speed information processing device on the user side; namely at the store or the like. Further, since the remaining processes require a small amount of computation, the remaining processes can be executed as extended functions of an information processing device set up at the store to serve as the sales information management device, and this can reduce the cost born by the user.

The cloud computer 21 may be configured to execute all of the necessary processes or to execute at least the notification process and the display information generation process of the necessary processes. Such a structure makes it possible to output the notification and to display the analysis result on a mobile terminal such as a smartphone 22 in addition to the PC 3 set up at the store and the PC 11 set up at the head office, and this allows a user to check the notification and the analysis result not only at the store or the head office but also at any other place, such as a place the user is visiting on business.

Further, though in the above embodiments, the analysis result was output on the monitor 4 of the PC 3 set up at the store, it is also possible to provide an output device for outputting the analysis result separately from the PC 3. For example, it is possible to use the PC 11 set up at the head office or the smartphone 22 as a browser device for viewing the analysis result, or to provide the sales information management device set up at the store with a function of a browser device for viewing the analysis result. It is also possible to output the analysis result through a printer.

Further, though in the above embodiments, the analysis result output screen was displayed on the monitor 4 of the PC 3 set up at the store, it is possible to provide an information processing device for performing necessary input and output, particularly a mobile information processing device such as a tablet terminal, separately from the PC 3 that executes the goods monitoring process.

INDUSTRIAL APPLICABILITY

The goods monitoring device, goods monitoring system and goods monitoring method according to the present invention have an advantage of being capable of making a notification instructing a goods management work at an appropriate and effective timing, and thus, are useful as a goods monitoring device, a goods monitoring system and a goods monitoring method for monitoring the display state of the goods based on captured images of a display area in a store.

Glossary 1 camera
2 recorder
4 monitor
6 input device
12 monitor
21 cloud computer
22 smartphone
31 surveillance unit
32 goods monitoring unit
33 analysis unit
41 goods detection unit
42 goods state detection unit
43 person detection unit
44 person state detection unit
45 notification determination unit
46 notification unit
51 information storage
52 aggregation unit
53 GUI control unit
54 goods state aggregation unit
55 person state aggregation unit
56 input information acquisition unit
57 screen generation unit (display information generation unit)

The invention claimed is:

1. A goods monitoring device for monitoring a display state of goods based on captured images of a display area in a store, the device comprising:
a processor; and
a memory that stores an instruction,
the processor, when executing the instruction stored in the memory, perform operations comprising:
detecting goods in the display area based on captured images of the display area;
detecting a goods display state in the display area based on a result of the detection of the goods;
detecting persons staying in the store based on captured images of an interior of the store;
detecting a person staying state in the store based on a result of the detection of the persons;
determining propriety of a notification instructing a store staff member to perform a goods management work based on a result of the detection of the goods display state and a result of the detection of the person staying state; and
generating the notification based on the determined propriety of the notification,
an information storage that stores information relating to the goods display state at each detection time of the goods display state, and information relating to the generated notification, the processor further performs operations comprising:
acquiring a result of aggregation over time relating to a temporal transition of the goods display state and a state of generation of the notification based on the information stored in the information storage;
integrally displaying the temporal transition of the goods display state and the state of generation of the notification based on the result of aggregation over time;
displaying a frame image having a color and indicating a detection area in the captured images of the display area based on the goods display state at a detection time of the good display state, the detection of the goods being performed in the detection area, the frame image being integrally displayed with the temporal transition of the goods display state and the state of generation of the notification, and
changing the color of the frame image depending on a change in the goods display state over time, such that the color corresponding to a first goods display state at a first detection time of the first display state is different from the color corresponding to a second goods display state at a second detection time of the second goods display state, the first goods display state being different from the second display state, the first detection time being different from the second detection time.

2. The goods monitoring device according to claim 1, wherein:
the processor detects, as the goods display state, at least one of a display disturbance state and a display shortage state; and
generating a notification instructing the store staff member to perform, as the goods management work, at least one of an arranging work for resolving a disturbance in goods display and a replenishing work for resolving a shortage of goods.

3. The goods monitoring device according to claim 1, wherein the processor determines the propriety of the notification based on at least one of inventory information, sales information and store staff assignment information, in addition to the result of the detection of the goods display state and the result of the detection of the person staying state.

4. The goods monitoring device according to claim 1, wherein:
the processor detects, as the goods display state, a display disturbance state and a display shortage state; and
the processor, when executing the instruction stored in the memory, further performs operations comprising:
receiving an input operation by a user;
acquiring, in accordance with the input operation by a user, input information indicating selection of a type of notification corresponding to each of the display disturbance state and the display shortage state,
wherein the processor acquires a result of aggregation relating to the state of generation of the notification of the type selected by the user based on the acquired input information and
the processor generates display information relating to the result of the aggregation.

5. The goods monitoring device according to claim 1, wherein:
the processor acquires, as the person staying state, a number of staying persons at each detection time of the person staying state;
the information storage stores the acquired number of staying persons at each detection time of the person staying state;
the processor acquires a result of aggregation relating to a temporal transition of the number of staying persons based on the information stored in the information storage; and
the processor integrally displays the temporal transition of the number of staying persons with the temporal transition of the goods display state and the state of generation of the notification based on the result of aggregation.

6. The goods monitoring device according to claim 1, wherein
the information storage stores the result of detection of the goods display state at each detection time of the goods display state;
the processor, when executing the instruction stored in the memory, further performs operations comprising:
aggregating, for one or more predetermined aggregation periods, the detection result at each detection time stored in the information storage, and acquires the goods display state for each of the one or more aggregation periods; and
generating display information relating to the goods display state for each of the one or more aggregation periods.

7. A goods monitoring system for monitoring a display state of goods based on captured images of a display area in a store, the system comprising:
a camera that captures images of an interior of the store and images of a display area; and
a plurality of information processing devices,
wherein any one of the plurality of information processing devices comprises:
a memory that stores instructions; and
a processor that, when executing the instructions stored in the memory, performs operations comprising:
detecting goods in the display area based on the images of the display area captured by the camera;
detecting a goods display state in the display area based on a result of the detection of the goods;
detecting persons staying in the store based on the images of the interior of the store captured by the camera;
detecting a person staying state in the store based on a result of the detection of the persons;
determining propriety of a notification instructing a store staff member to perform a goods management work based on a result of the detection of the goods display state and a result of the detection of the person staying state; and
generating the notification based on the determined propriety of the notification,
an information storage that stores information relating to the goods display state at each detection time of the goods display state, and information relating to the generated notification,
the processor further performs operations comprising:
acquiring a result of aggregation over time relating to a temporal transition of the goods display state and a state of generation of the notification based on the information stored in the information storage;
integrally displaying the temporal transition of the goods display state and the state of generation of the notification based on the result of aggregation over time;
displaying a frame image having a color and indicating a detection area in the captured images of the display area based on the goods display state at a detection time of the good display state, the detection of the goods being performed in the detection area, the frame image being integrally displayed with the temporal transition of the goods display state and the state of generation of the notification, and changing the color of the frame image depending on a change in the goods display state over time, such that the color corresponding to a first goods display state at a first detection time of the first display state is different from the color corresponding to a second goods display state at a second detection time of the second goods display state, the first goods display state being different from the second display state, the first detection time being different from the second detection time.

8. A goods monitoring method for monitoring a display state of goods based on captured images of a display area in a store, the method comprising, when a processor of an information processing device executes instructions stored in a memory of the information processing device:

detecting goods in the display area based on captured images of the display area;

detecting a goods display state in the display area based on a result of the detection of the goods;

detecting persons staying in the store based on captured images of an interior of the store;

detecting a person staying state in the store based on a result of the detection of the persons;

determining propriety of a notification instructing a store staff member to perform a goods management work based on a result of the detection of the goods display state and a result of the detection of the person staying state; and generating the notification based on the determined propriety of the notification, storing, in an information storage, information relating to the goods display state at each detection time of the goods display state, and information relating to the generated notification;

acquiring a result of aggregation over time relating to a temporal transition of the goods display state and a state of generation of the notification based on the information stored in the information storage;

integrally displaying the temporal transition of the goods display state and the state of generation of the notification based on the result of aggregation over time;

displaying a frame image having a color and indicating a detection area in the captured images of the display area based on the goods display state at a detection time of the good display state, the detection of the goods being performed in the detection area, the frame image being integrally displayed with the temporal transition of the goods display state and the state of generation of the notification, and changing the color of the frame image depending on a change in the goods display state over time, such that the color corresponding to a first goods display state at a first detection time of the first display state is different from the color corresponding to a second goods display state at a second detection time of the second goods display state, the first goods display state being different from the second display state, the first detection time being different from the second detection time.

9. The goods monitoring device according to claim 1, wherein:

the temporal transition of the goods display state is displayed with a line graph, the state of generation of the notification is displayed with a predetermined mark on the line graph at a position corresponding to a time when the notification is generated, the captured image of the display area is displayed adjacent to the temporal transition of the goods display state, and the frame image is displayed with a rectangle enclosing the detection area in the displayed captured images of the display area.

* * * * *